United States Patent [19]

Levecque et al.

[11] 4,052,183

[45] Oct. 4, 1977

[54] METHOD AND APPARATUS FOR SUPPRESSION OF POLLUTION IN TORATION OF GLASS FIBERS

[75] Inventors: Marcel Levecque, Saint-Gratien; Jean A. Battigelli, Rantigny, both of France

[73] Assignee: Saint-Gobain Industries, Neuilly-sur-Seine, France

[21] Appl. No.: 557,281

[22] Filed: Mar. 11, 1975

Related U.S. Application Data

[63] Continuation-in-part of Ser. No. 353,983, April 24, 1973, Pat. No. 3,874,886, which is a continuation-in-part of Ser. No. 456,878, April 1, 1974.

[30] Foreign Application Priority Data

June 14, 1976 France ............................... 75-04039

[51] Int. Cl.[2] ....................... C03B 37/06; C03C 25/02

[52] U.S. Cl. ....................................... 65/3 C; 65/4 R; 65/5; 65/16; 264/12; 264/176 F; 425/17

[58] Field of Search .................. 65/3 C, 4 R, 9, 11 R, 65/5, 16; 425/80, 210, 225; 264/112, 116, 12

[56] References Cited

U.S. PATENT DOCUMENTS

| | | | |
|---|---|---|---|
| 2,940,134 | 6/1960 | Herritage | 19/156.1 |
| 3,347,648 | 10/1967 | Krakauer | 65/3 C |
| 3,356,565 | 12/1967 | Smucker et al. | 65/3 C X |
| 3,442,633 | 5/1969 | Perry | 65/5 |
| 3,709,670 | 1/1973 | Eriksen | 65/8 |
| 3,771,929 | 11/1973 | Hellman et al. | 264/12 |
| 3,791,807 | 2/1974 | Etzel | 65/3 C |
| 3,874,886 | 4/1975 | Levecque et al. | 65/5 X |
| 3,885,940 | 5/1975 | Levecque et al. | 65/5 |

*Primary Examiner*—Robert L. Lindsay, Jr.
*Attorney, Agent, or Firm*—John T. Synnestvedt

[57] ABSTRACT

Method and apparatus for the production of fibrous materials from attenuable substances, particularly molten glass, are disclosed, along with the fiber products which result. In the disclosed system the material to be fiberized flows into a region established as a result of the interaction of a jet transversely oriented with respect to a larger blast, the material being acted upon in the interaction zone to produce a highly attenuated fiber. There are also disclosed techniques for suppression of pollution in manufacturing plants using the disclosed fiberization techniques.

28 Claims, 38 Drawing Figures

14D
132B
126B
126C
110
10A
14B
111
12A
128
118A
118B
118C
14C
126A
116A
116B
116C
124C
120B
130
14B
124B
124A
132A
14D
120A
14C 128
120 A
112A
10A
114A
124A
112B
114B
124B
112C
114C
122A
124C
111
12A
130
110
118C
116C
118B
116B
118A
116A
120B
126A
126B
126C
132 B
132 A
122 B
124A
124B
124 C
116B
118B
116C
118C

Fig. 22.
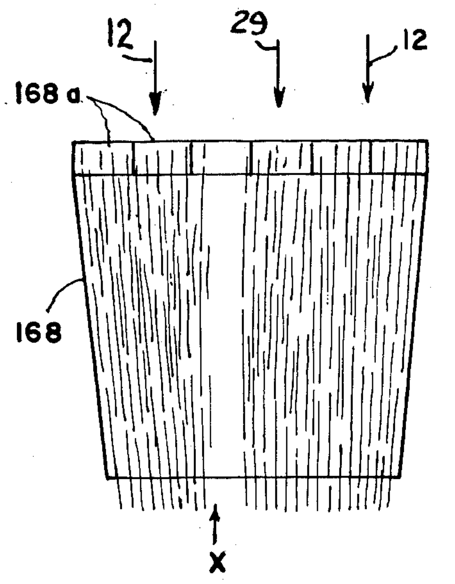
Fig. 23.
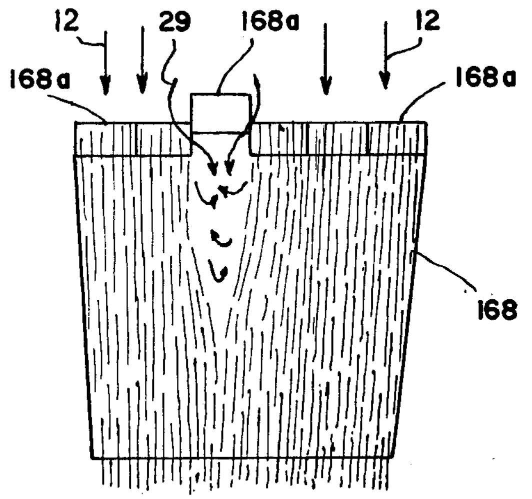
Fig. 24.
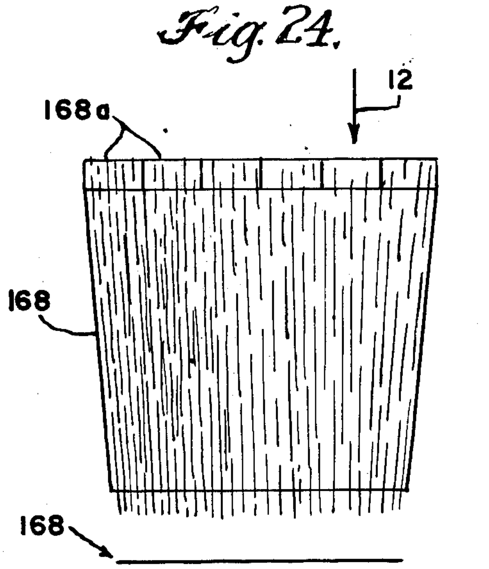
Fig. 25.
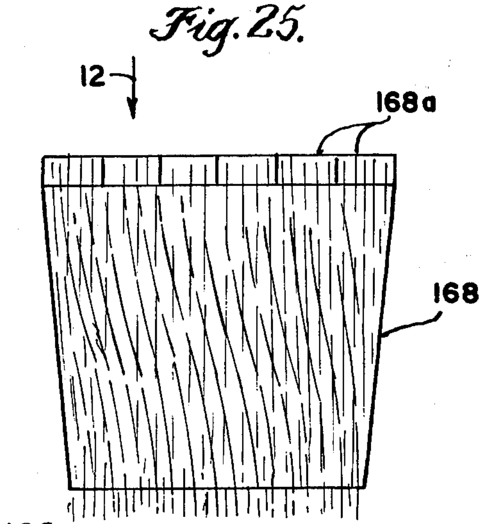
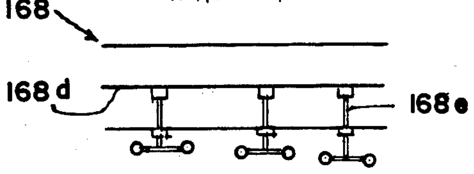
Fig. 26.
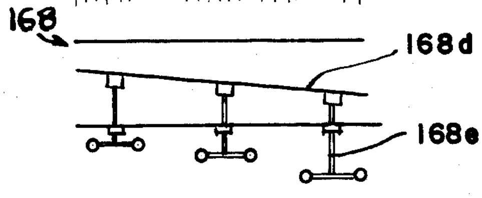
Fig. 27.

METHOD AND APPARATUS FOR SUPPRESSION OF POLLUTION IN TORATION OF GLASS FIBERS

CROSS REFERENCES

The present application is a continuation-in-part of our prior applications Ser. No. 353,983, filed Apr. 24, 1973 and issued Apr. 1, 1975 as U.S. Pat. No. 3,874,886, and Ser. No. 456,878, filed Apr. 1, 1974. Attention is also called to the fact that said prior application Ser. No. 353,983 and also the present application disclose certain subject in common application Ser. No. 353,984, filed Apr. 24, 1973 by the present applicants jointly with another, and issued May 27, 1975 as U.S. Pat. No. 3,885,940. The ommission of claims directed to any features herein disclosed is not to be understood as an abandonment of that subject matter because such features are claimed in companion copending applications.

TABLE OF CONTENTS

In connection with the following listing of the headings and in connection with the text of the specification between the headings as inserted in the specification, it is to be understood that not all of the text which intervenes between successive headings is necessarily directly related to the subject of the preceding heading, because in many instances interrelated subjects are jointly considered or are considered in overlapping sequence.

ABSTRACT
CROSS REFERENCES
TABLE OF CONTENTS
INTRODUCTION
BACKGROUND
STATEMENT OF THE PRIOR ART
1. Longitudinal Blowing
2. Strand
3. Aerocor
4. Centrifuging
ANALYSIS OF THE PRIOR ART
BIBLIOGRAPHY OF PRIOR PATENTS
OBJECTS AND ADVANTAGES
BRIEF DESCRIPTION OF DRAWINGS
BRIEF DESCRIPTION OF TORATION
FIG. 1
GENERAL STATEMENT OF VARIABLES
ANALYSIS OF TORATION - FIG. 2
ACTION ON GLASS
FIG. 3A
INTRA-AXIAL SPACING RANGE
TRANSVERSE AND UPSTREAM-DOWNSTREAM INTER-AXIAL SPACING RANGE (PART A)
FIG. 3
FIG. 4
FIG. 5
INTER-AXIAL SPACING RANGE (PART B) (WITH STAGGERED CENTERS)
FIGS. 6 AND 7
FIG. 8
FIGS. 9A-B-C
FIGS. 12 AND 12A (PART A)
GLASS TEMPERATURES (PART A)
GLASS COMPOSITION
GLAS ORIFICE SIZE
GLASS TEMPERATURES (PART B)
FIG. 10
FIG. 11
FIGS. 12 AND 12A (PART B)
FIGS. 13A-B
INTER-AXIAL SPACING RANGE (PART C)
VELOCITY AND ENERGY OF BLAST AND JET
ANGLE OF JET TO BLAST
INTER-AXIAL SPACING RANGE (PART D)
FIGS. 14A-D
FIGS. 15A-D
BLAST AND JET TEMPERATURES
BLAST AND JET VELOCITIES AND PRESSURES
FIBER SIZE AND CHARACTERISTICS
SPECIFIC EXAMPLES
GLASS COMPOSITION (PART B)

INTRODUCTION

The invention relates to fine fibers and to the production thereof from a substance in a condition in which it is capable of being attenuated, such substances being hereafter generally referred to as "attenuable materials", particularly attenuable materials which soften or liquefy upon entering a molten state as a result of the application of heat and which harden, or become relatively solid, upon cooling.

The process and equipment of the invention are especially suited to the formation of fibers from glass and the disclosure herein accordingly emphasizes glass fibers and their production.

BACKGROUND .

There are four rather well-defined and recognized prior art techniques by which glass fibers can be made, these four techniques, which are mentioned at this point but discussed in more detail herebelow, being:

1. LONGITUDINAL BLOWING:

Other terms sometimes used include "blown fiber," "steam blown wool," 37 steam blown bonded mat," "low pressure air blowing," or "lengthwise jets."

2. STRAND:

Other terms sometimes used are "continuous filament," or "textile fibers."

3. AEROCOR:

Another term sometimes used is "flame attenuation."

4. CENTRIFUGING:

Other terms sometimes used include "rotary process," "centrifugal process," "tel process," or "supertel process."

There are numerous variants of each of the above four processes, and some effects in the art to combine certain of the processes. Further, there are other techniques discussed in the prior art by which prior workers have attempted to make glass fibers. However, the variants, attempted combinations, and attempted other techniques have not met with sufficient success to achieve a separate and recognizable status in the art.

As will be clear from a study of this specification, the invention presents a new, fifth technique which is unique in principle and practice, and which brings about unique results, and therefore is the starting point of a new art.

For this reason, and also because a diligent search has failed to reveal any suitable existing English word which aptly applies to our invention, we have coined the work "torate," a verb, and the word "toration," a noun, to refer to our new technique and product. The usage of these new words in the present specification will illuminate their meanings, but for present purposes it is pointed out that, by our new technique, glass can be "torated" into fibers, the jet and blast which cooperate to effect fiberization can be referred to as the "torating" current or blast, the fibers which result can be said to have been "torated," or to be "torated" fibers, and the process involved can be referred to as "toration."

STATEMENT OF THE PRIOR ART

Attention is now turned to a more detailed survey of the four prior art techniques briefly mentioned above. The numbers appearing within parentheses in the text below refer to prior art referencs fully identified in the bibliography set forth at the end of this section.

1. LONGITUDINAL BLOWING

Longitudinal blowing (see prior art items 1, 2, 3 and 4 in the bibliography below) is a glass fiber manufacturing process according to which melted glass flows from the forehearth of a furnace through orifices in one or two rows of tips protruding downwardly from a bushing, the glass being thereby formed into multiple glass streams which flow down into an attenuating zone where the streams pass between downwardly converging gaseous blasts. The blast emitting means are located in close proximity to the streams so that the converging blasts travel in a downward direction substantially parallel to the direction of travel of the glass streams. Generally the glass streams bisect the angle between the converging blasts. The blasts are typically high pressure steam.

There are two longitudinal blowing techniques. In the first technique the attenuating blasts engage already drawn fibers and the product resulting is typically a mat, commonly known as "steam blown bonded mat," suitable for reinforcement. In the second longitudinal blowing technique the attenuating blasts strike directly on larger streams of molten glass and the product resulting is typically an insulation wool commonly known as "steam blown wool."

In a variation (see prior art item 5 of bibliography below) of the first longitudinal blowing technique, the entire bushing structure and associated furnace are enclosed within a pressure chamber so that, as the streams of glass emerge from the bushing, the streams are attenuated by pressurized air emerging from the pressure chamber through a slot positioned directly beneath the glass emitting tips of the bushing, this variation being commonly referred to as "low pressure air blowing," and products being commonly known as "low pressure air bonded mat and staple yarn."

2. STRAND

The strand glass fiber manufacturing process (see items 6 and 7) begins in the manner described above in connection with longitudinal blowing, that is, multiple glass streams are formed by flow through orifices in tips protruding downwardly from a bushing. However, the strand process does not make use of any blast for attenuation purposes but, on the contrary, uses mechanical pulling which is accomplished at high speed by means of a rotating drum onto which the fiber is wound or by means of rotating rollers between which the fiber passes. The prior art patents in the field of the strand process are far too numerous to mention and are of no real significance to the present invention. Therefore, it is considered sufficient that the references noted above are illustrative of the strand process.

3. AEROCOR

In the aerocor process (see items 8 and 9) for making glass fibers, the glass is fed into a high temperature and high velocity blast while in the form of a solid rod, rather than flowing in a liquid stream as in the longitudinal blowing and strand processes discussed above. The rod, or sometimes a coarse filament, of glass is fed from a side, usually substantially perpendicularly, into a hot gaseous blast. The end of the rod is heated and softened by the blast so that fiber can be attenuated therefrom by the force of the blast, the fiber being carried away entrained in the blast.

4. CENTRIFUGING

In the centrifuging glass fiber manufacturing process (items 10 and 11) molten glass is fed into the interior of a rapidly rotating centrifuge which has a plurality of orifices in the periphery. The glass flows through the orifices in the form of streams under the action of centrifugal force and the glass streams then come under the influence of a concentric and generally downwardly directed hot blast of flames or hot gas, and may also, at a location concentric with the first blast and farther outboard from the centrifuge, come under the action of another high speed downward blast, which latter is generally high pressure air or steam. The glass streams are thereby attenuated into fine fibers which are cooled and discharged downwardly in the form of glass wool.

ANALYSIS OF THE PRIOR ART

It has long been recognized that it is desirable to produce glass fibers exceedingly small in diameter, for example on the order of a few microns, because products made with such fine fibers have remarkable advantages, including strength, good thermal insulating capability and other physical properties. Further, while the length of the fiber is more or less significant accordingly to the purpose for which the fiber is to be used, it is generally desirable that the fibers be long rather than short. Still further, it is highly advantageous, particularly from the standpoint of the economics of fiber production, that a high production rate be utilized in the manufacturing process employed. One way to reach a high production rate is to have a high orifice pull rate. By "orifice pull rate" we mean to denote the amount of production accomplished within a given time from a single fiber producing center. "A single fiber producing center" means one orifice emitting one glass stream in the longitudinal blowing process, the strand process, and the centrifuging process, and it means one rod of glass in the aerocor process. In toration it means one glass cone from which a single fiber is drawn. Pull rates for a given process are typically given in terms of kilograms, or pounds, or tons, per hour, or per twenty-four hour period.

To summarize, it is generally desirable to make very fine fibers, very long fibers, and to make fibers to a high orifice pull rate, but these objectives conflict with each other, insofar as prior art processes are concerned. Therefore it has always been necessary that a selection be made to sacrifice one or more desiderata in order to obtain the others. Further, each of the prior art processes can effectively serve to make only one or a narrow range of products. For example, by the strand process very fine continuous fibers can be made, but the orifice pull rate is low and the resultant product is not economically useable in the form of glass wool. On the other hand, the centrifuging process makes fibers at a relatively higher orifice pull rate but they tend to be short and they are produced in the form of wool and cannot be readily organized to make roving or other reinforcing products or textiles. The wool resulting from the centrifuging process is very satisfactory in products such as building insulation in which considerable ranges of fiber diameters and lengths in the finished product are satisfactory; however, where the insulation and product strength requirements are very high, other techniques of manufacture, such as the aerocor process, the generally employed.

The aerocor process makes long and fine fibers, if orifice pull rates comparable to those of the centrifuging process are used. But the aerocor process cannot be operated at an orifice pull rate high enough to effectively compete with the centrifugal process. As the orifice pull rate in the aerocor process is progressively increased, there is a corresponding increase, unavoidably, in fiber diameter, until a certain diameter is reached and if the orifice pull rate is increased even further, the glass rod utilized in the process will tend to pass through the gaseous blast without being completely melted and this results in the inclusion in the product of an unacceptably high number of bent pieces of relatively coarse glass fiber, these bent pieces being known as "hooks."

In the above described first longitudinal blowing technique the fibers in the bonded mat are long and uniform in diameter, but the orifice pull rates are relatively low. An attempt to increase the orifice pull rates generates unfiberized material having the shape of insufficiently drawn glass drops.

It is the prime characteristic of the invention to obtain fine and long fibers at very high orifice pull rates.

In the second longitudinal blowing technique the orifice pull rates can be very high, but the attenuating blasts break the glass streams prior to attenuation with the result that a large portion, even up to 50%, of the glass is unifiberized and lodges in the wool product in the form of slugs; further, the fiber is very short and irregular in diameter.

It is a important characteristic of the invention to obtain the fine and long fibers at high pull rates, as discussed above, while at the same time producing fiber practically free of unifiberized material.

Many prior workers have made repeated efforts to optimize the manufacture of glass fibers by one or more of the processes which start with molten streams of glass. Various of these proir art techniques have been concerned with trying to optimize the attenuation process by extending or lengthening the attenuation zone, either by providing special means to accomplish the addition of heat to the streams of glass and to the embryonic fibers (item 12), or through the use of confining jets (items 13 and 14), or both (item 15).

The approach taken in the just mentioned prior art technique suggests that the realization of optimum fiberization lies in extending the length of the attenuating zone.

Contrary to such teachings, in the practice of the present invention, attenuation is accomplished in the course of a short path length, on the order of one to two centimeters. Therefore, as will be more readily apparent from the explanation of the subject invention which follows, it is an important characteristic of the invention that the fibers are removed, very early in the process, to a cool zone, in which no further attenuation is possible.

Various other approaches have been suggested for introducing glass in the molten state into an attenuating blast (items 16, 17, 18 and 19). In such attempts to introduce a stream of molten glass into an attenuating blast it has been noted that there often is a tendency of the glass stream to veer to a path of travel on the periphery of the blast, that is, to "ride" the blast, rather than penetrating into the core region of the blast where attenuating conditions are more effective. Suggestions have been made to deal with this "riding" problem, including the use of physical baffles as in Fletcher (item 16), and the transfer of substantial kinetic energy to the glass stream as, for example, by the modifications of the centrifuging process taught in Levecque (item 11), Paymal (item 18), and Battigelli (item 19).

An alternate approach to the problem, more closely akin to the aerocor process, has been the introduction of the glass in the form of a solid (item 9) or pre-softened (item 20) glass rod or in the form of powdered glass (item 14).

In contrast, it is another important characteristic of the invention to introduce glass in the molten state, in a progressive and very stable way, into an attenuating zone where the attenuating parameters are the most efficacious.

BIBLIOGRAPHY OF PRIOR PATENTS

1. Slayter et al U.S. Pat. No. 2,133,236
2. Slayter et al U.S. Pat. No. 2,206,058
3. Slayter et al U.S. Pat. No. 2,257,767
4. Slayter et al U.S. Pat. No. 2,810,157
5. Dockerty U.S. Pat. No. 2,286,903
6. Slayter et al U.S. Pat. No. 2,729,027
7. Day et al U.S. Pat. No. 3,269,820
8. Stalego U.S. Pat. No. 2,489,243
9. Stalego U.S. Pat. No. 2,754,541
10. Levecque et al U.S. Pat. No. 2,991,507
11. Levecque et al U.S. Pat. No. 3,215,514
12. Stalego U.S. Pat. No. 2,687,551
13. Stalego U.S. Pat. No. 2,699,631
14. Karlovitz et al U.S. Pat. No. 2,925,620
15. Karlovitz U.S. Pat. No. 2,982,991
16. Fletcher U.S. Pat. No. 2,717,416
17. Eberle U.S. Pat. No. 3,357,808
18. Paymal U.S. Pat. No. 3,634,055
19. Battigelli U.S. Pat. No. 3,649,232
20. Stalego U.S. Pat. No. 2,607,075

OBJECTS AND ADVANTAGES

In contrast with all of the foregoing, it is a major objective of the present invention to provide a technique for producing glass fibers (as well as the resulting fibers themselves) in which it is not necessary to sacrifice any one of the major desiderata above referred to, namely, fineness of fiber, long fiber length and high pull rate.

Because of the accomplishment of the above major object, with the technique of the present invention it is possible to produce fibers adapted to a much wider range of uses than has been practicable with any one of the presently known techniques.

Another object of the invention is the provision of a technique for producing mineral fibers which is readily adaptable to adjustment of operating conditions so as to selectively produce fibers adapted to a wider variety of uses than has been practicable heretofore. The broad range of fiber types and characters capable of being produced by the technique of the present invention makes it unnecessary in many situations to rely upon more than one technique or process for various different products. In the glass fiber industry this presents outstanding advantages because of the capability of producing a wider range of products with a single technique, thereby eliminating substantial investment in capital equipment which would otherwise be required in order to produce the same range of products by presently known or conventional techniques.

The invention further has in view the provision of a technique for producing glass fibers in which various limitations of the prior art techniques are eliminated. For example, the technique of the present invention requires only static equipment, in contrast with the widely used centrifuge method in which the fiberizing equipment rotates at high speed, thus necessitating special high precision machinery and maintenance. Static equipment makes it possible to construct the equipment from materials which have very high strength at high temperatures in static conditions, without the need to have high temperatures strength in dynamic conditions. This allows fiberizing a broader range of materials.

As another example of eliminating prior art limitations, the technique of the present invention greatly simplifies and facilitates the introduction of molten glass into the interior of a blast for purposes of attenuation, the means or system for accomplishing such introduction of the glass in the process of the invention being explained more fully hereinafter. This feature of the invention is in striking contrast to various of the prior art systems for introducing glass into an attenuating blast, such as the aerocor process above described, in which a solid glass rod is fed into the blast, to be softened and melted. As above pointed out this type of system is severely limited with respect to pull rate and has a tendency to develop "hooks." In contrast, the feed of the molten glass into the attenuating zone within the torating blast in the technique of the present invention makes possible much higher orifice pull rates than are possible with the aerocor process, and this is accomplished with the technique of the present invention with a negligible amount of unfiberized material and moreover, while maintaining fineness of fibers.

A still further object of the present invention is to provide a technique for making mineral fibers in which a wider variety of batch formulations may be utilized in the making of fibers, over a wide range of fiber properties or characteristics, than is possible with any one of the presently known processes.

It is another general objective of the present invention to accomplish all of the foregoing and at the same time provide for suppression of pollution from glass fiber manufacturing plants.

The foregoing and other objects and advantages which are attained, including numerous specific advantages flowing from toration will be explained more fully hereinafter.

THE DRAWINGS

Figure 12:
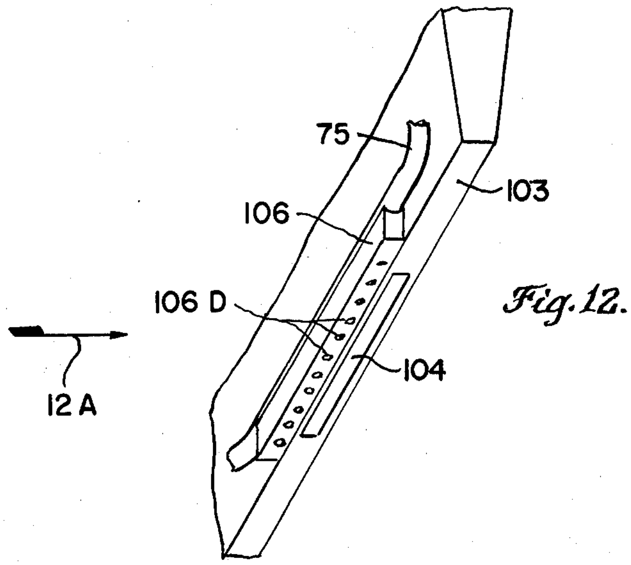
FIG. 12 illustrates still another feature contemplated for use, i.e., the provision of a slot shaped orifice for feeding attenuable material into the interaction zone from the crucible, the slot being shown in association with a row or series of jet emitting orifices. This view is a perspective view, taken from a position below and to one side of the fiberizing station.
Figure 12A:
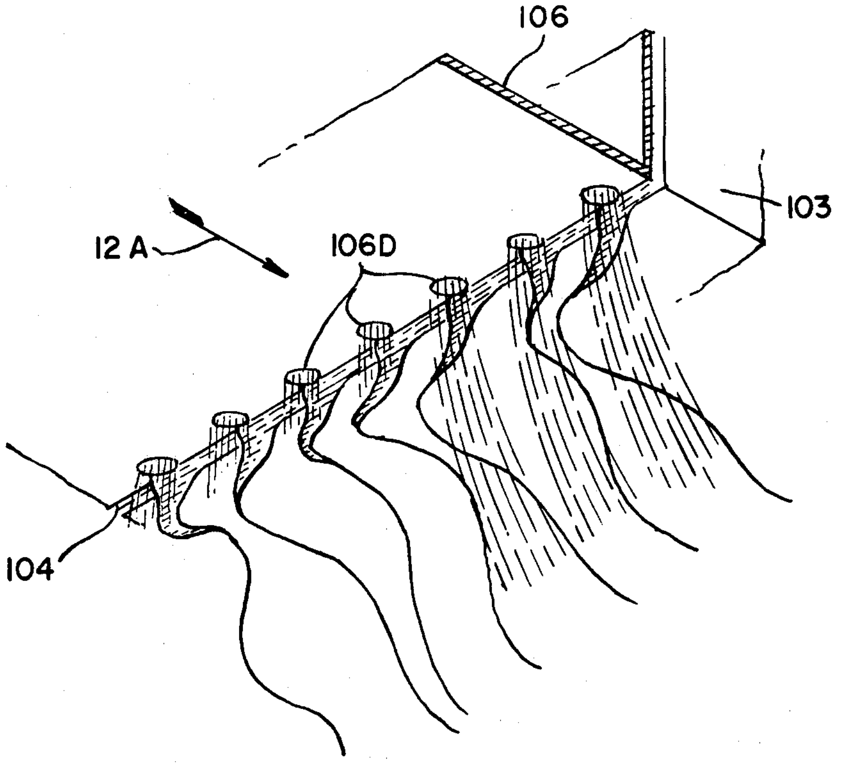

FIG. 12A is a perspective view, taken from an angle of observation similar to that used in FIG. 12, of equipment of the general kind shown in FIG. 12, that is, equipment utilizing a glass emitting slot associated with a plurality of jet orifices, this view being on an enlarged scale as compared to FIG. 12, and showing a plurality of glass cones emanating from the slot and a glass fiber being torated from each cone.

Figure 13A:
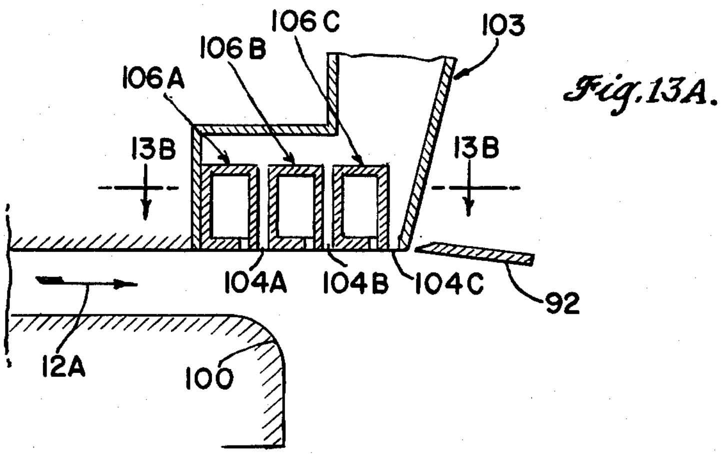
Figure 13B:
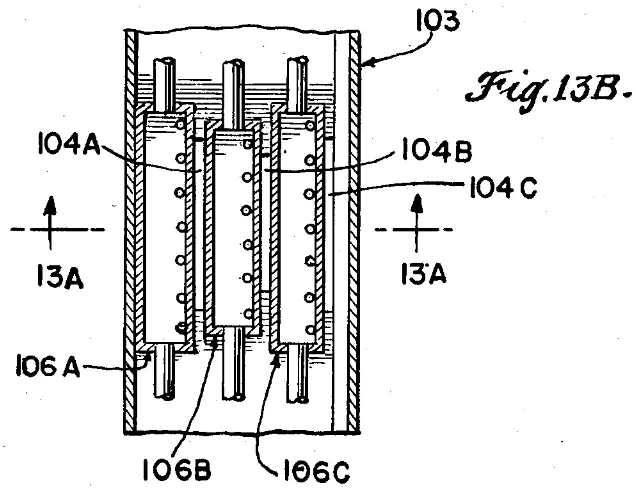

FIGS. 13A and 13B are sectional views illustrating a further variation in the equipment which may be employed, which yields a high density of fibers from a single blast by providing plural rows, each row in turn being equipped with plural fiberizing centers, FIG. 13A being taken as indicated by the line 13A on FIG. 13B and FIG. 13B being taken as indicated by the line 13B on FIG. 13A.

Figure 14A:
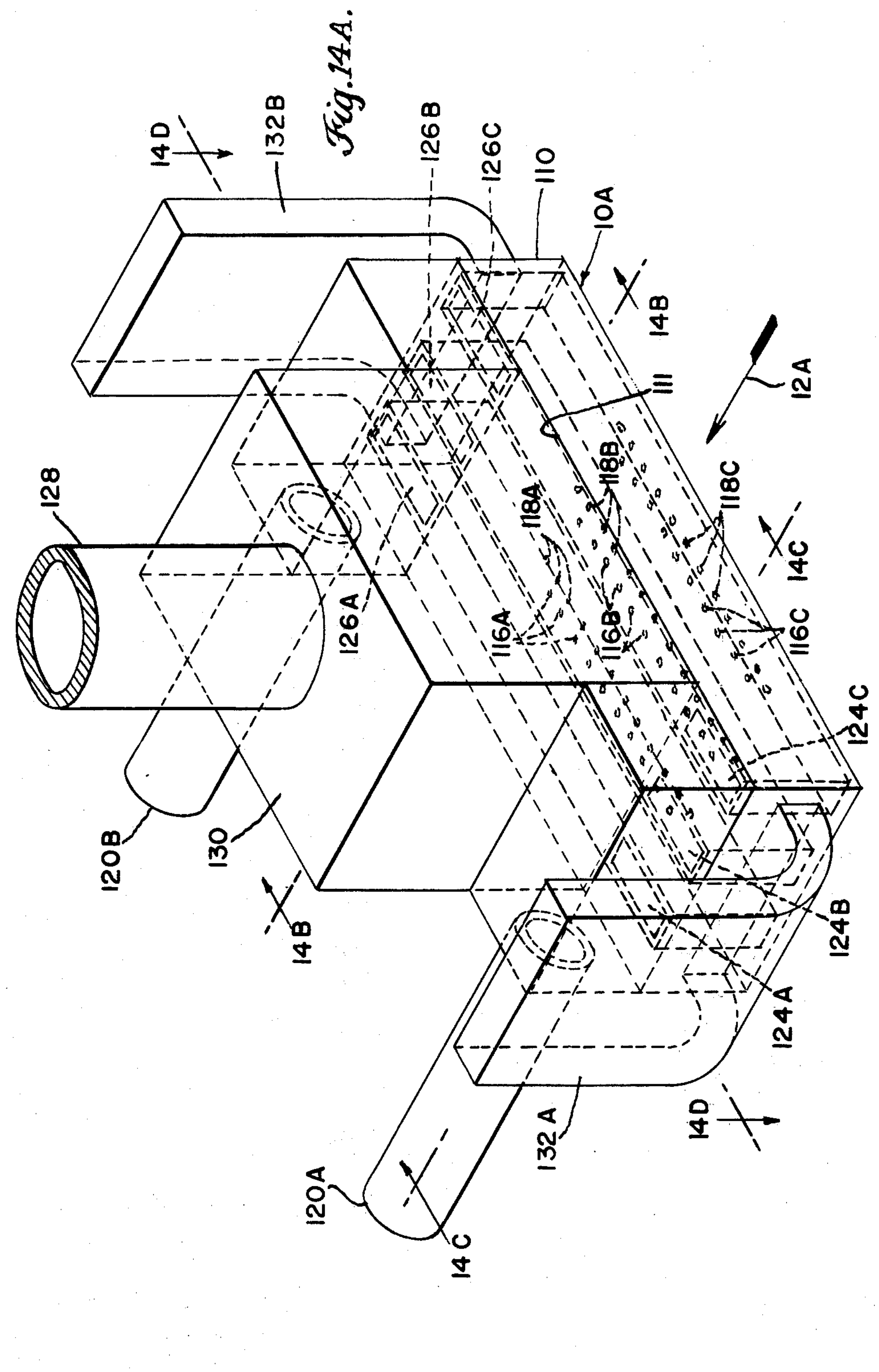
Figures 14B, 14C, 14D:
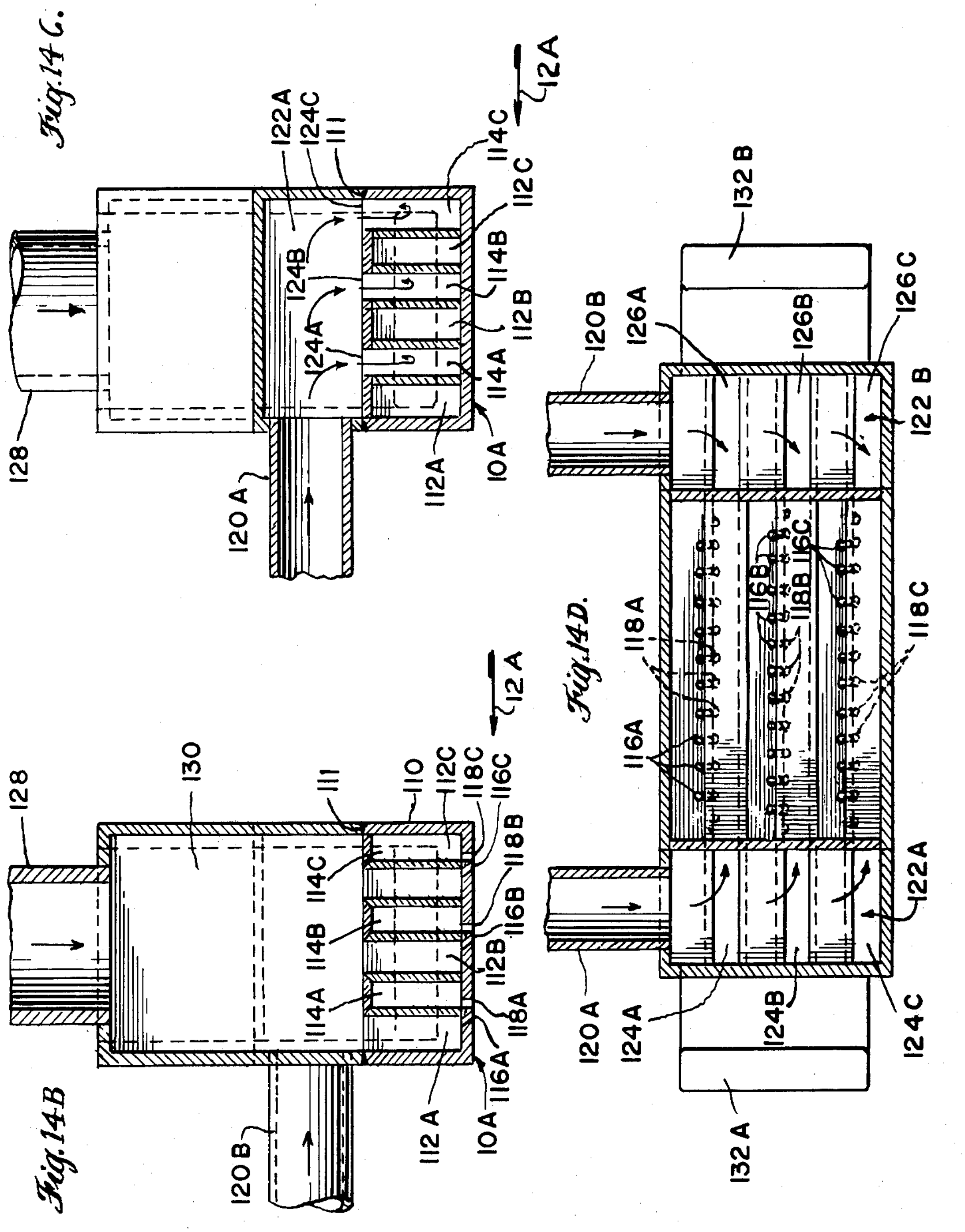

FIGS. 14A, 14B, 14C and 14D are, respectively, an isometric view and various sectional views of another form of apparatus usable in the practice of the present invention, the sectional views 14B, 14C and 14D being taken as indicated by the section lines 14B, 14C and 14D on FIG. 14A.

Figure 15A:
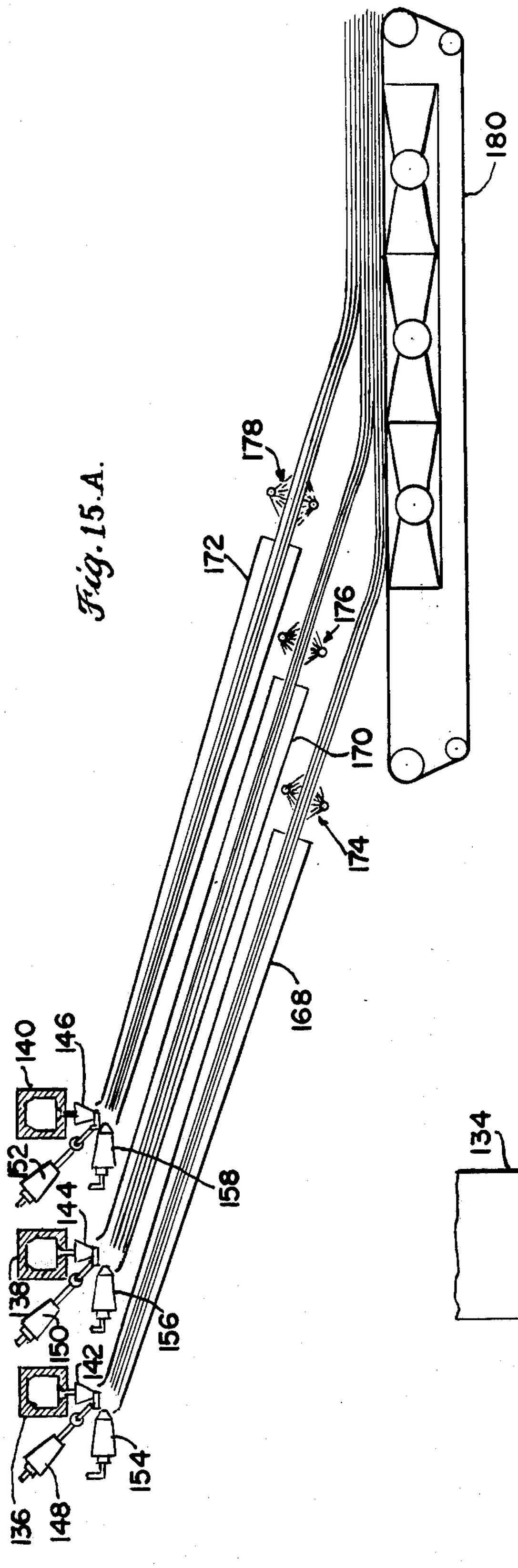
Figure 15B:
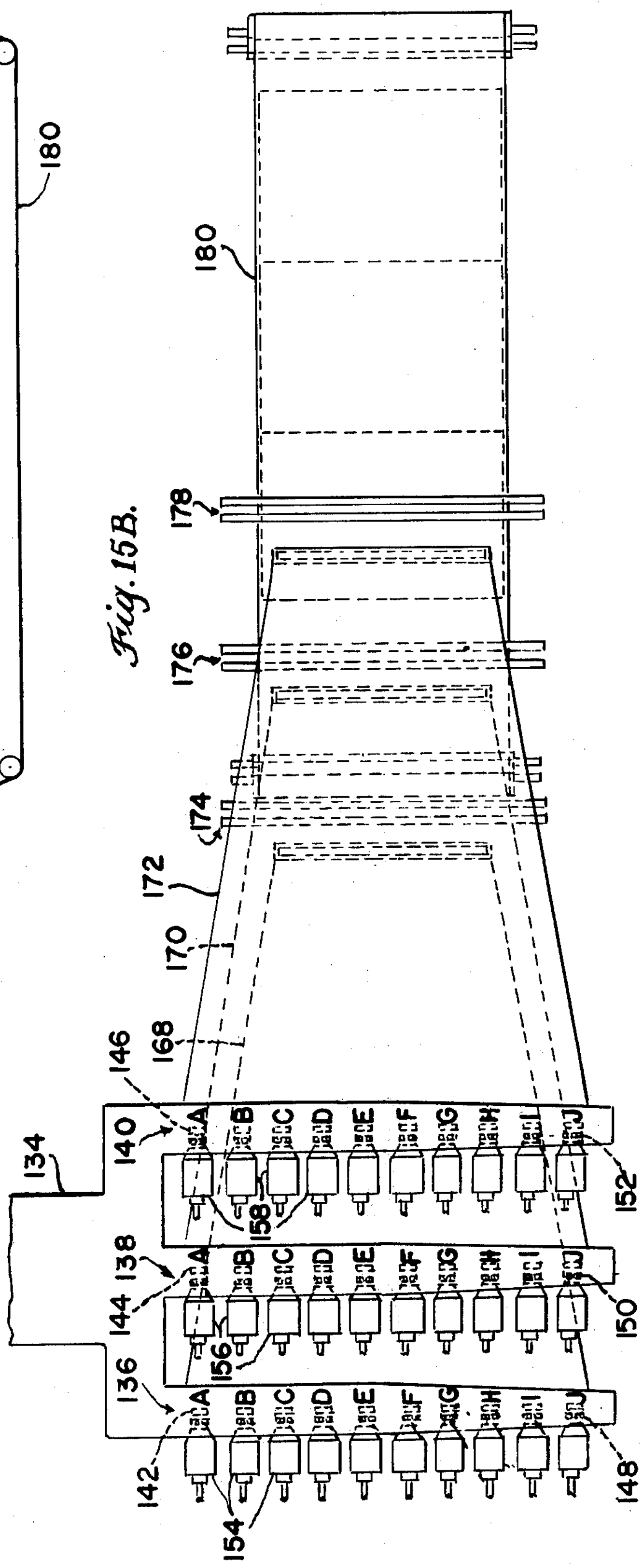
Figure 15D:
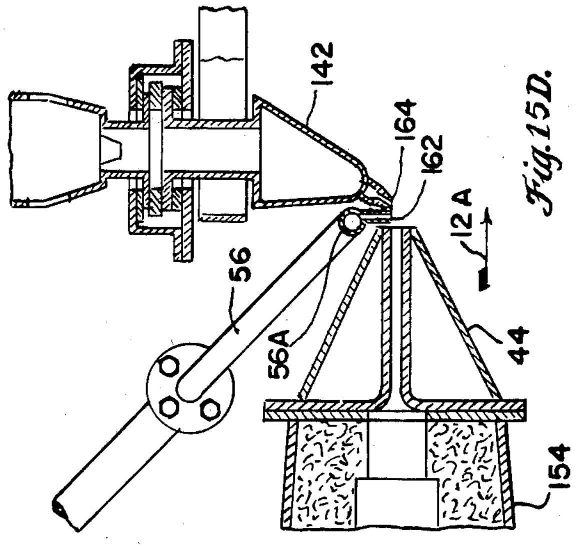
Figure 15C:
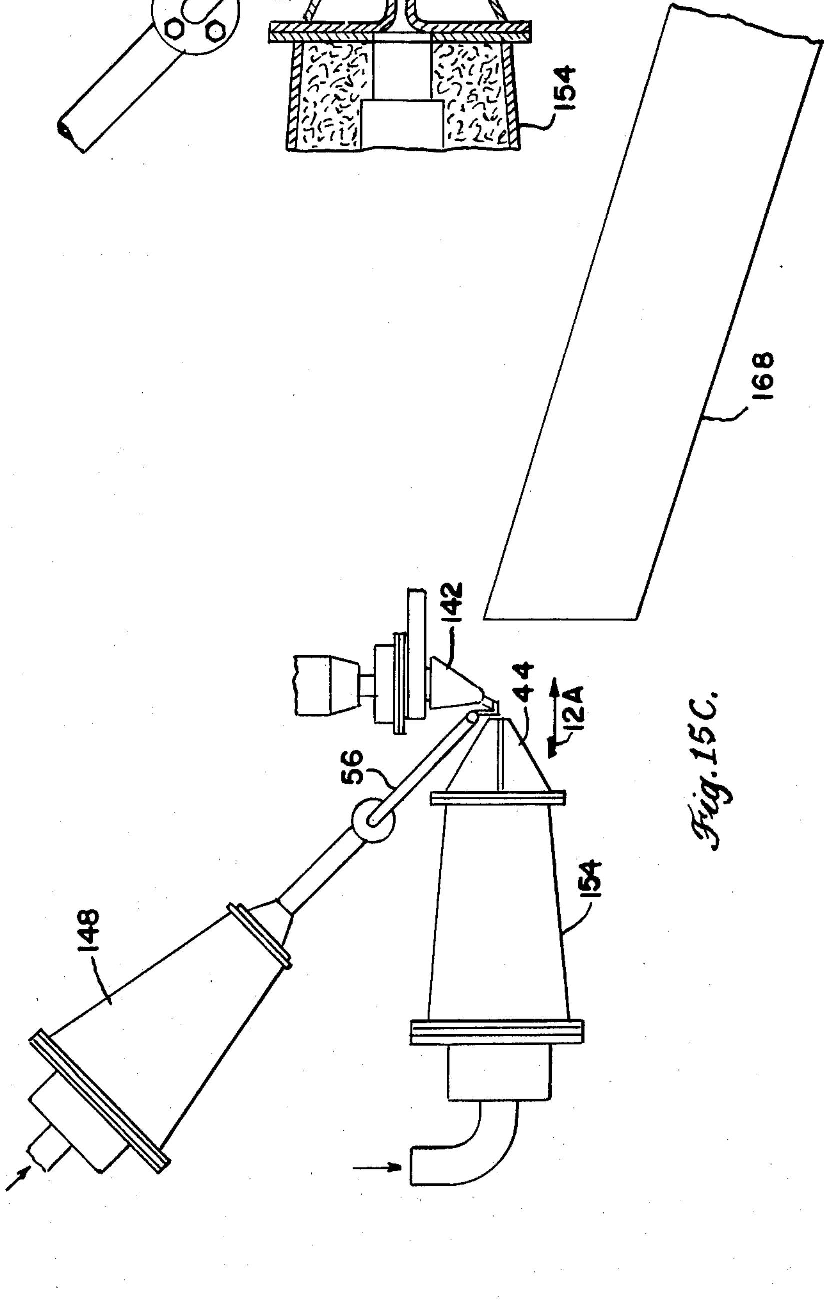

FIGS. 15A, 15B, 15C and 15D are views illustrating equipment which may be employed for relatively large scale production, FIGS. 15A and 15B being elevational and plan views, respectively, showing the general arrangement of the major components, FIG. 15C being an enlarged elevational view of the equipment at one fiberizing center and FIG. 15D being a still further enlarged sectional view at the fiberizing center of FIG. 15C.

Figure 16:
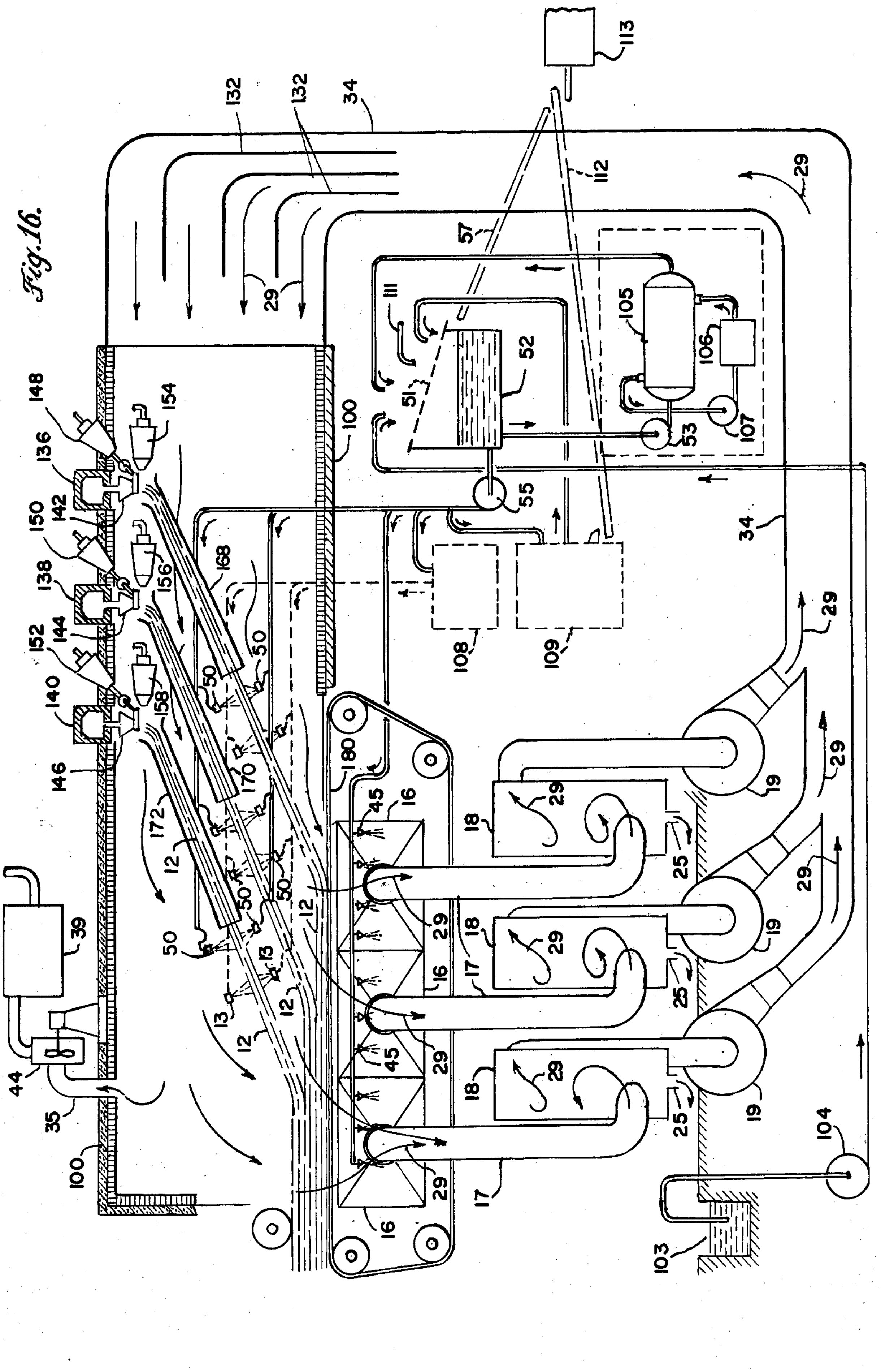

FIG. 16 is a schematic representation of all of the major components of one embodiment of a plant incorporating not only the equipment of a plant for effecting fiberization of molten glass by toration and the formation of a fiber blanket, but also various devices for suppression of pollution, as will be described more fully hereinafter.

Figure 17:
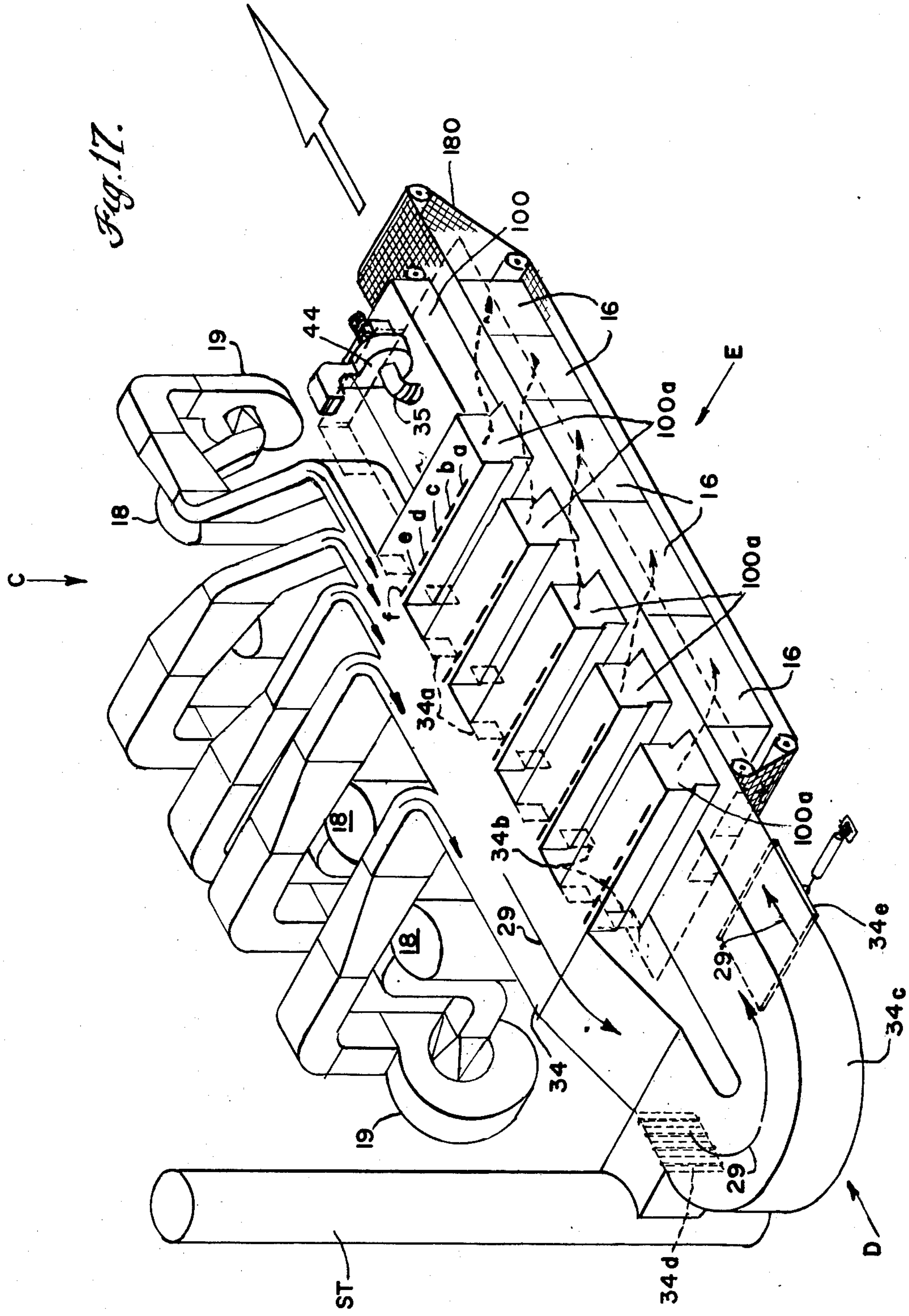
Figure 18:
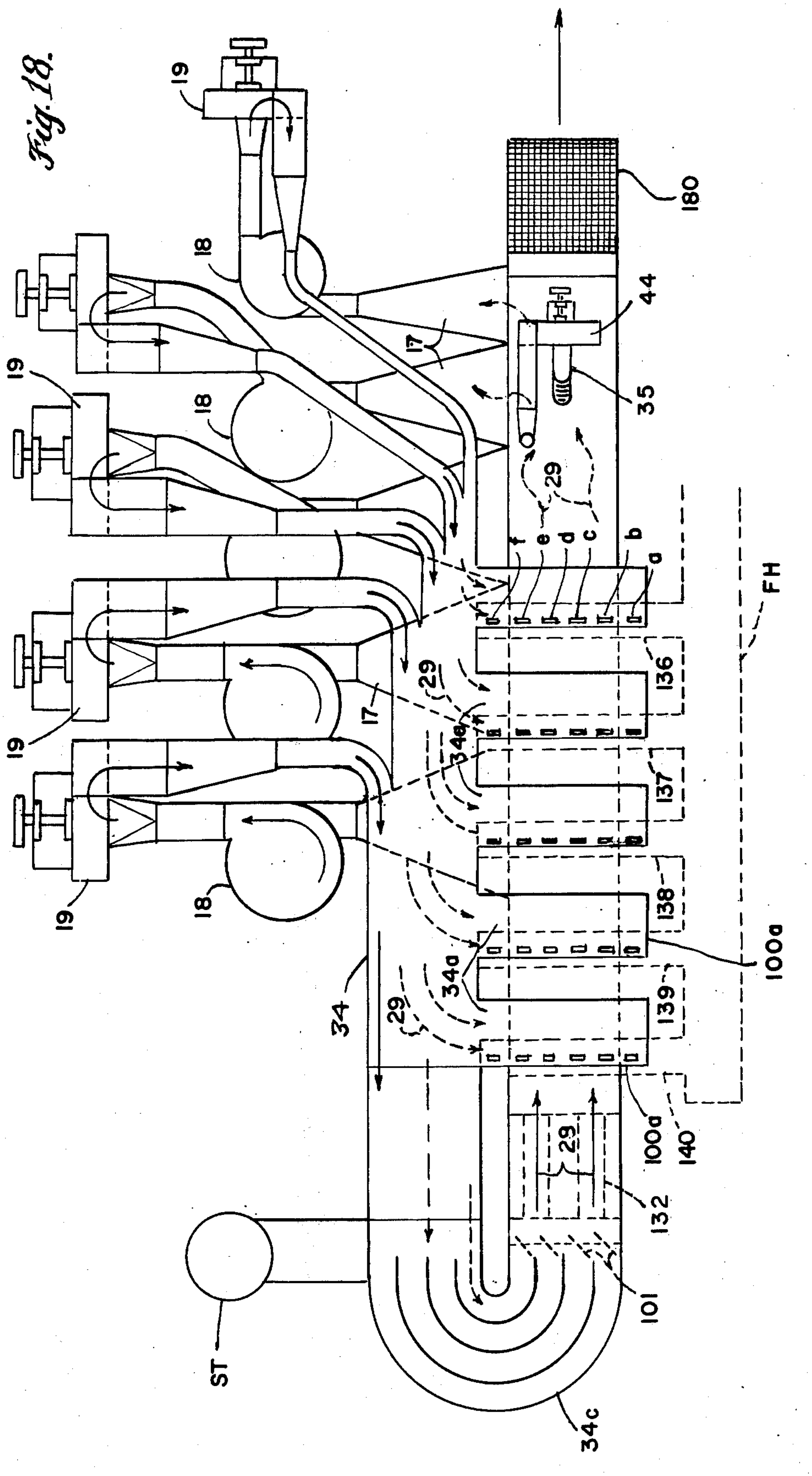
Figure 19:
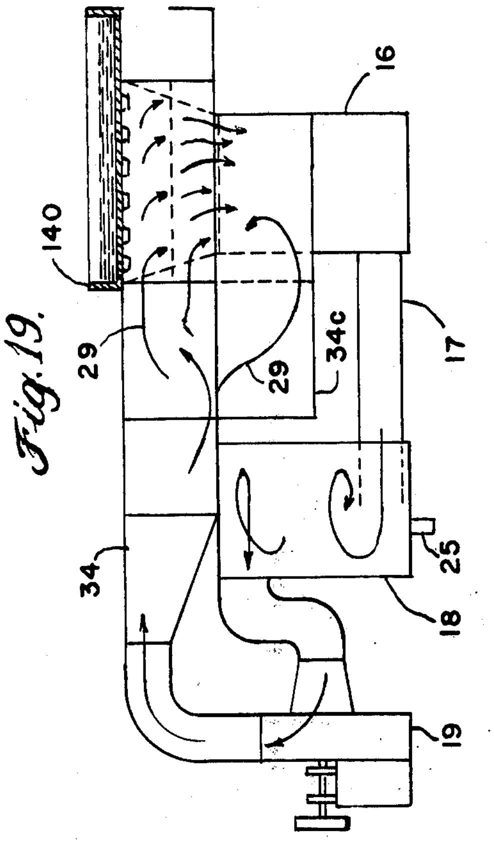
Figure 20:
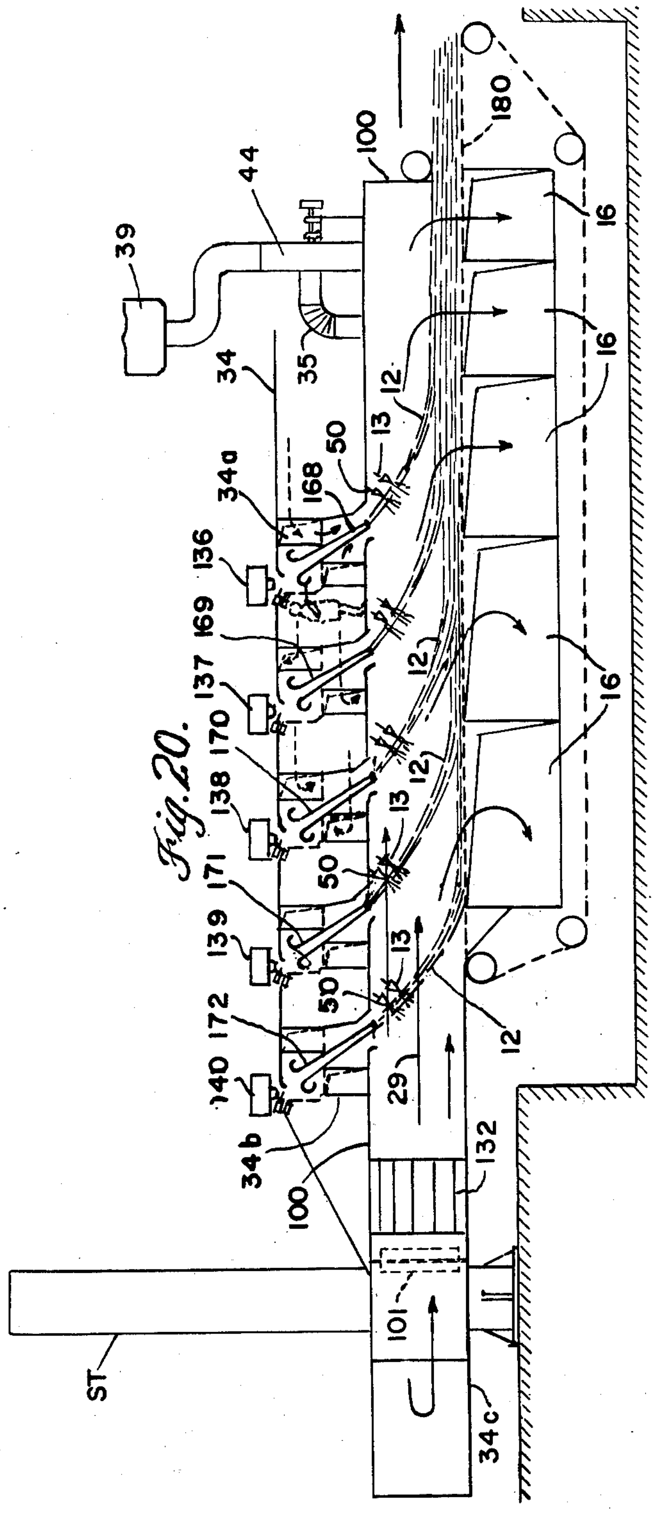
Figure 21:
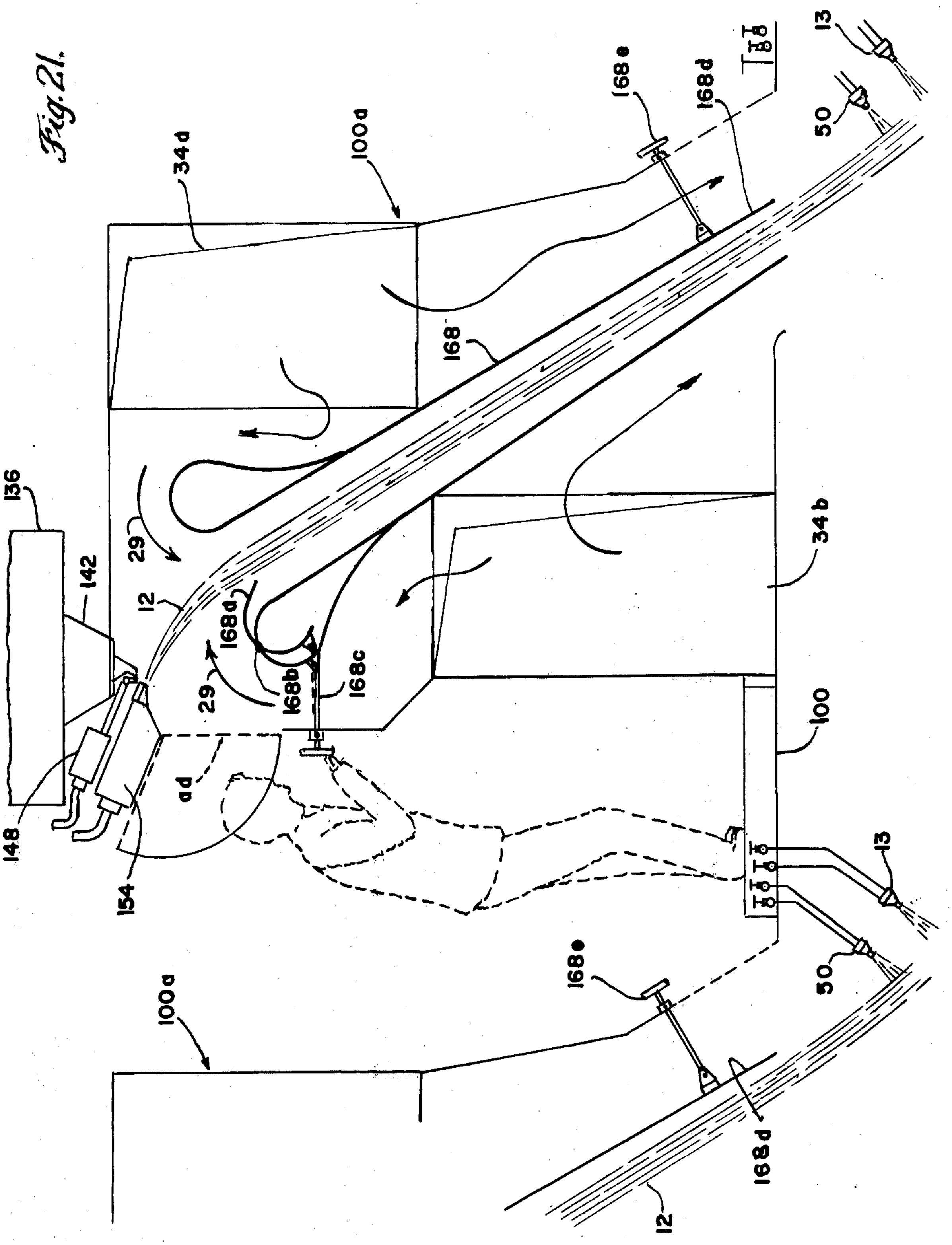

FIGS. 17 to 27 inclusive are somewhat diagrammatic and schematic outline views of another plant of the general kind above referred to but illustrating various additional structural parts and relationships thereof, and in which:

FIG. 17 is a schematic outline perspective representation of the major components of both the fiberizing and pollution suppression equipment of this embodiment;

FIG. 18 is an outline plan view of the equipment shown in FIG. 17, FIG. 18 being taken generally as indicated by the arrow C applied to FIG. 17;

FIG. 19 is an outline end elevational view of the equipment of FIG. 17, taken generally as indicated by the arrow D on FIG. 17, but omitting certain parts for the sake of simplicity;

FIG. 20 is a side outline elevational view, taken generally as indicated by the arrow E on FIG. 17, but also omitting certain parts, and having additional parts broken away to disclose others lying within;

FIG. 21 is an enlarged diagrammatic outline view of equipment associated with one of the fiberizing stations viewed in the same direction as FIG. 20 and with certain parts shown purely schematically in order to simplify the illustration;

FIGS. 22 and 23 are flow diagrams illustrating the action of one form of adjustment means provided for enhancing uniformity of fiber distribution in the fiber blanket being made; and FIGS. 24 and 25 are additional diagrams of fiber distribution patterns which may be accomplished by adjustment of certain devices diagrammatically illustrated in FIGS. 26 and 27.

TORATION

The terms "toration," a noun, and "torate," a verb, as mentioned above and as used herein, constitute contractions of the words "tornado" and "attenuation" and are used to denote the action on an attenuable material in the zone of interaction created when a blast, or first jet, is penetrated by a transversely oriented second jet, the latter being completely encompassed or enveloped by the former. Clearly defined and forceful currents, including two counterrotating tornadoes, or whirls, or vortices, having substantial angular velocity, are generated by the interaction of the two jets, and these currents, by frictional licking or sweeping against the surface of the attenuable material, exert forces tending to induce the attenuable material to flow toward and into the zone of interaction; the material then is brought more and more under the influence of the tornadoes and forms itself into an elongated cone from the tip of which a fine fiber is drawn by the combined flows of the jets. It is surprising that, although located in a whirling zone with very high velocities, the glass cone nevertheless is stable and that its cross section reduces progressively from its base at the plane of emission to its tip, from which a single fiber starts. It is also very surprising that this fiber, although, at least part of the time, it has a nearly helicoidal movement at an increasing amplitude and velocity, continuously emanates from the cone in a continuous attenuation process.

The virtual lack of slugs in the fiber manufactured by toration is due to the dimensional and positional stability of the glass cone and to the continuity of the unique fiber attenuation.

The interaction phenomenon as described hereabove and which is of fundamental importance to the invention, can occur with a plate limiting one of the borders of the blast and through which the secondary jet is flowing. This same phenomenon can take place in embodiments, such as that of FIG. 12 described hereinafter, in which the plate is so small that it is virtually non-existant, or even without any plate. The interaction phenomenon is essentially the same, whether or not there is a plate. Since we prefer to employ at least some form of plate, although it may be of quite limited extent, in the following description we emphasize embodiments in which there is a plate.

FIG. 1

Figure 1:
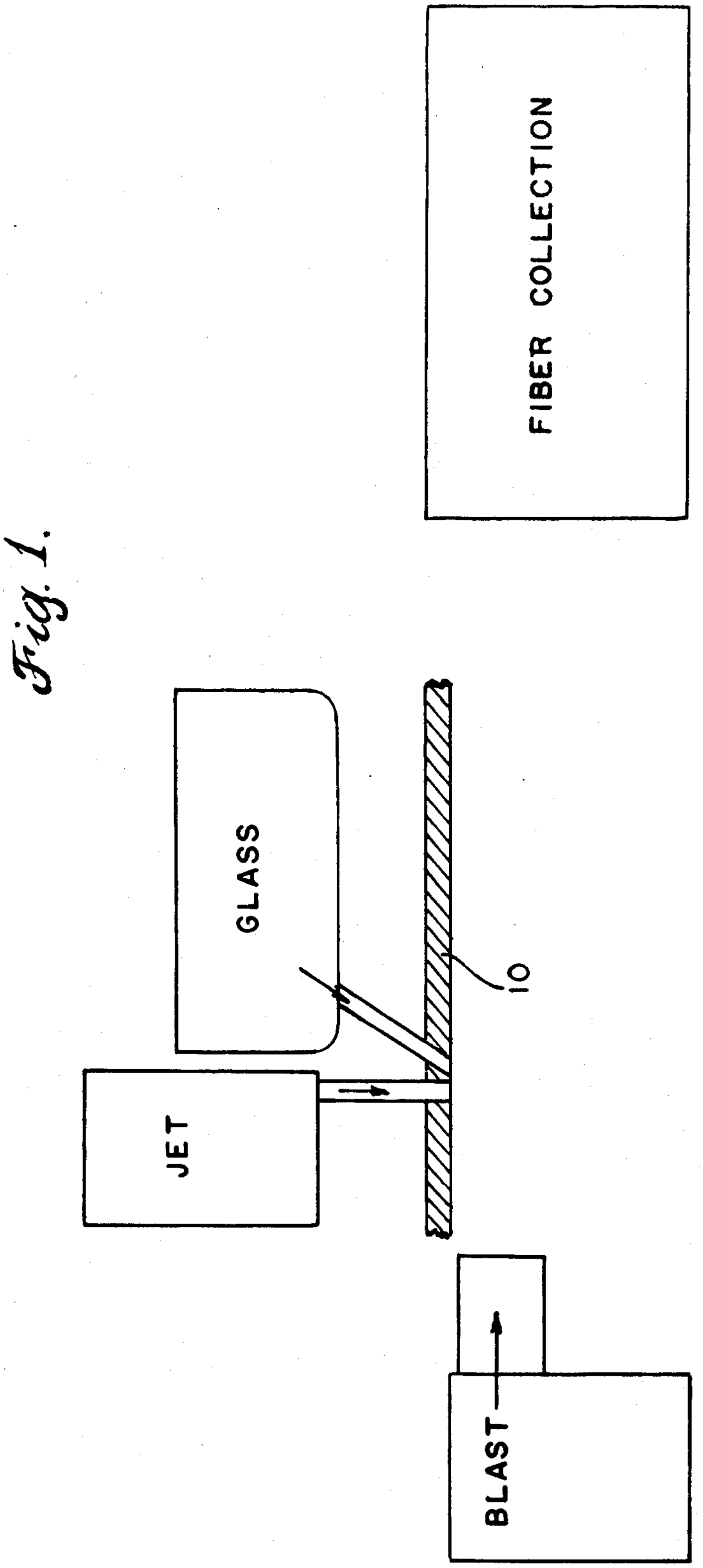
FIG. 1 is a diagrammatic representation of the major components of one system according to the invention, showing the general interrelation of the components for producing a blast and for producing a jet transverse to the blast, as well as the glass supply means and the fiber collection device.

Referring first to FIG. 1, a blast, or primary jet source, is indicated at the left, being arranged to deliver the blast along a surface, in this case the under-surface, of a plate or wall 10. The source of a secondary jet is also indicated, being arranged to deliver through the plate 10 so as to penetrate into the blast. The attenuable material, such as glass, is also delivered through the plate 10, and in the embodiment of FIG. 1 the point of delivery of the glass into the blast is just downstream of the point of delivery of the jet into the blast. An appropriate fiber collection means is indicated at the right in FIG. 1.

GENERAL STATEMENT OF VARIABLES

One possible way to control the quantity, quality, and size of the resulting fibers is by regulating the flow rate of the attenuable material. The regulation of the flow rate of attenuable material can be accomplished in a number of ways, e.g., by varying the temperature of the attenuable material so as to alter its viscosity characteristics. In the case of glass, generally speaking, the higher the temperature the lower the viscosity; further, when changes in the constituents of the glass are made so as to obtain different fiber quality, in view of its end use, such changes in the constituents of the glass can effect changes in the viscosity at a given temperature.

Other parameters which can be manipulated in order to control toration include the blast and jet fluid compositions, and the temperatures and the velocities of the blast and the jet. Typically, the interacting jets are composed of the same fluid, such as the products of combustion resulting from the burning of a suitable gaseous fuel, and in such circumstances the performance of toration, throughout a considerable temperature range, can be gauged in terms of the relative velocities of the primary and secondary jets. However, it must be kept in view that any substantial differences between the densities, or the viscosities, of the two jets can have a quite considerable impact on toration, and these additional factors can be accommodated in toration by taking account of the kinetic energies of the fluid streams, rather than just their velocities. The kinetic energy of a given volumetric unit of a fluid stream is directly proportional to the product obtained by multiplying its density by the square of its velocity.

In order to effect toration, the kinetic energy of the jet per unit of volume must be greater than that of the blast in the operational area thereof.

Additional control over the results obtainable by toration can be exercised by varying the orifice sizes, positions and configuration, particularly with respect to the secondary jet. Additional refinements to the basic apparatus are discussed below with respect to the various illustrated embodiments of the present invention.

ANALYSIS OF TORATION - FIG. 2

Figure 2:
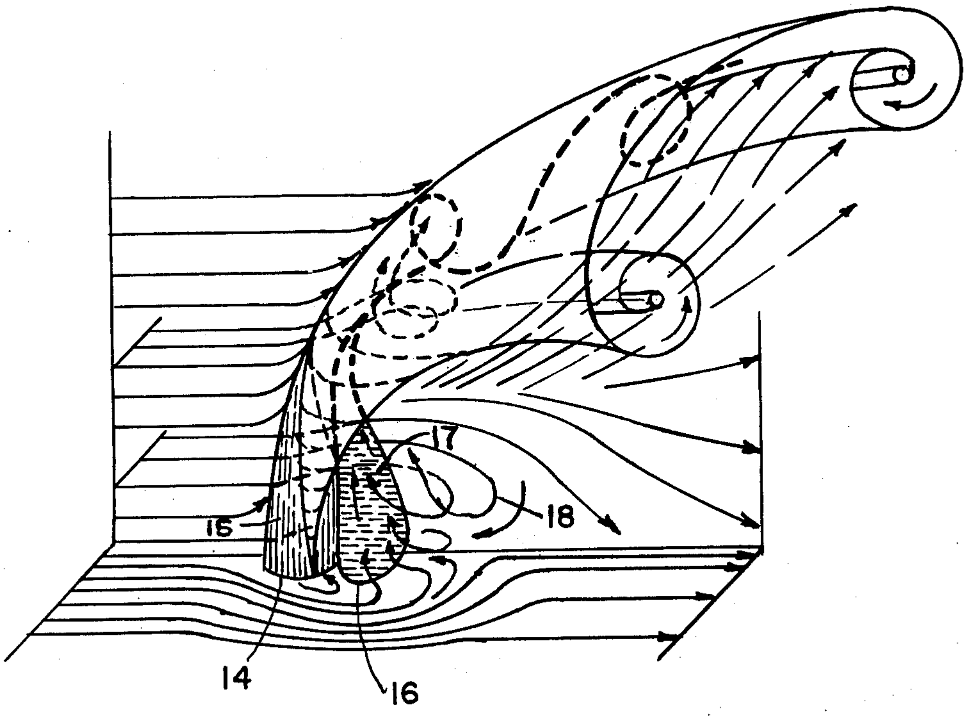
FIG. 2 is a diagrammatic perspective view, of the action at a fiberizing center according to said parent application and showing a pattern of flow of gases and glass which is typical of toration, this view being inverted as compared with FIG. 1, that is, showing the glass and jet flowing upwardly instead of downwardly.

In further explanation of the operative forces responsible for toration, reference is made to FIG. 2 which presents, in part, our actual observations and, in part, our theoretical suggestions and conclusions as to the zone of interaction created by intersecting jets and as to the resultant fluid flow which gives rise to the whirl or miniature tornado phenomena hereinbefore referred to as being of importance in toration. The FIG. 2 shows the same general arrangement of the components of a fiberizing center as in FIG. 1, but shows the secondary jet in inverted position as compared to FIG. 1, that is the jet is directed upwardly instead of downwardly, and further FIG. 2 is on a very much enlarged scale as compared to FIG. 1. It is to be understood that the toration fiberizing center may be arranged in any desired relation to the horizontal.

In the representation of toration as appearing in FIG. 2 the principal jet or blast 12A travels from left to right. The secondary jet 15 is oriented substantially perpendicular to the principal jet and, in a sense, can be said to intercept it, with respect to a part of the blast. The relative relationship of the principal jet and the secondary jet is such that the secondary jet is completely enveloped by the principal jet. The significance of this operative relationship will become more readily apparent from the analysis of the complete process of toration which is presented herebelow.

Reference herein is repeatedly made to "upstream" and "downstream"; unless the context clearly requires a different meaning, these terms have reference to the flow of the blast.

JET INTERACTION ACTIVITY

The blast splits and flows around the secondary jet while the secondary jet substantially maintains its thrust and its integrity, and can be said to pierce through the blast.

Since the secondary jet is unconfined (in the sense that it is not within a tube or other solid-walled flow passage), its flow at its periphery induces some fluid of the blast to flow along with it, that is, some fluid of the blast is carried along with the flow of the secondary jet. The interaction results in the generation of generate a region of relatively reduced pressure that is, negative pressure, immediately downstream of the secondary jet.

The split portions of the blast flow around the secondary jet toward the negative pressure region and thus rejoin each other to form strong recirculation currents shown in FIG. 2 by blast flow arrows 18 which curve right around on themselves, and also curve upwardly, and indicate flow having a component generally from right to left, countercurrent to the blast which, as above mentioned, is flowing generally from left to right.

The extent of the negative pressure region is a function of the ratio of the kinetic energies, per unit of volume, of the blast and jet. In the upstream-downstream sense the negative pressure region extends about 2 to 3 jet orifice diameters and in the lateral sense it extends about 1 to 2 jet orifice diameters.

The zone of interaction of the blast and the jet gives rise to the formation of two oppositely rotating tornadoes, or whirls, one on each side of the secondary jet slightly downstream of the midpoint thereof. As clearly shown in FIG. 2, these two tornadoes, or embryonic, vortices, swell substantially as they whirl upwardly and turn in a downstream direction.

Thus, the zone of interaction, is characterized by the inception of the two oppositely rotating tornadoes and by a region of negative pressure immediately downstream of the base of the secondary jet, the negative pressure being quite pronounced in the region between the bases of the tornadoes and in the region immediately downstream thereof.

As the secondary jet loses its individuality, that is, its initial velocity and direction characteristics, it gives rise to a new flow, a mixture of the jet and blast which can be called a torating flow or torating blast.

The layers of the blast which are adjacent the jet and flow alongside it give the tornadoes their direction of rotation. As a result of this direction of rotation, a fluid particle placed on the outer layers of either tornado would be carried over toward the concavity of the above mentioned double volute, being caught by the two tornadoes like between two counter rotating calendar rollers.

While the outer layers of the tornadoes rotate at velocities which are identical to the velocities of the layers of the blast adjacent the tornadoes, the interior or central portion of each of the tornadoes turns around its own axis at very high speed. Thus, each tornado has an induction effect, in an inward and upward direction, on the adjacent portions of the blast which are flowing around the secondary jet. The induced flow is directed upwardly along and inwardly into the concavity constituting the deformed shape of the residual secondary jet flow and of the mixing layer.

It is surprising that, while the fluid flows at very high velocities in the central portion of each of the tornadoes, these tornadoes are nevertheless stable; their apexes appear to be affixed to the edge of the secondary jet orifice, slightly downstream of the axis thereof, and the gaseous envelopes of the tornadoes are practically immobile.

ACTION ON GLASS

The glass is either emitted directly into the low pressure zone immediately downstream of the secondary jet, or is drawn into this zone in situations in which it is supplied some distance from it. The flow of the glass into this region can be relied upon to take place clearly, even if the glass emission orifice in the plate 10 is not located immediately adjacent the downstream side of the secondary jet. This is so because the recirculation currents, discussed above are quite pronounced and strong. Stated in another way, the glass localizes in the region of negative pressure just downstream of the secondary jet.

When viewed as in FIG. 2, the glass is drawn upwardly under the combined action of the gaseous currents and with the glass orifice 16 in a plate at the boundary of the blast, forms itself into a stable cone. Within the body of the glass, the glass travels out into the cone, essentially by laminar flow, and continuously, uniformly and progressively decreases in cross section as it flows toward the apex of the cone. The steady diminution in cross section is important to the production of a fiber of substantially uniform diameter along its length and insures the continuity of fiberizing.

From inspection of FIG. 2 it can be seen that the diminution in cross section of the glass takes place during, and in phase with, the expansion in the cross section of the two tornadoes, the flow of the glass into the cone occurring within the concavity formed by the tornadoes and the downstream side of the secondary jet. Thus, the glass cone is protected or shielded from the disruptive impact which the blast would have upon it. A resultant is the stability of the flow of the glass which is an important characteristic of toration.

Next to the plate the tornadoes or whirls are of very small cross section and the frictional surface interaction thereof against the glass is of quite limited extent. At locations progressively farther and farther away from the plate, the tornadoes are progressively larger and larger and have progressively larger surface contact with the glass, the consequence being that the tornadoes have a progressively increasing influence on the glass attenuation.

What has been described thus far comprises a process for delivering attenuable material in a molten state at a steady reproducible rate, and in a stream of cross section which is continuously and progressively reducing, into a region in which it can be drawn out into a fine fiber. In other words, the description up to this point concerns the supplying of the glass, in a molten state, to a region of high velocity gaseous flow.

The final phase of the attenuating process, e.g., the drawing out of the attenuable material into very fine fibers, takes place within a short length of glass flow from the top of the cone and thus extends for only about 3 to 5 jet secondary orifice diameters.

Toration is characterized by dramatically dynamic action. While we have witnessed the behavior of the glass by the naked eye and by means of high speed motion pictures, the experience undergone by the attenuable material occurs far too fast to be seen by the naked eye, and even too fast to be clearly captured by motion pictures. We have made extensive studies using motion pictures taken at 4,000, 6,500 and 10,000 frames per second and projected at speeds down to one frame per second. These studies have shown with certainty that from one cone tip there in only one single fiber drawn; but there remains an element of uncertainty as to the exact path of travel of this fiber.

What has been observed, particularly by means of the high speed motion pictures above mentioned, is a smooth continuously repititious, whipping action which appears to occur in a single plane but which more probably, because of the rotational nature of the whirling or vortical motion in the region of attenuation, actually follows a helical path, the pitch and the amplitude of which are increasing in the flow direction, for at least a substantial part of the time. FIG. 3A Turning now to FIG. 3A, therein is disclosed an embodiment of the subject invention having a plurality of fiberizing centers. Therein, the principal jet, or blast, generally depicted by the feathered arrow 12A, is shown as being emitted through an orifice comprising lips 24, which orifice may be part of an internal combustion chamber such as is described in the U.S. Pat. to Battigelli, No. 3,544,254 which issued Dec. 1, 1970, and which is assigned to the assignee of the present invention.

The blast is directed along a path against the wall 28. The wall 28 is equipped with a plurality of secondary jet orifices 32A, 32B and 32C, respectively spaced from each other in an upstream - downstream sense, together with a corresponding number of orifices for emitting attenuable material 33A, 33B and 33C. Although not appearing in FIG. 3A, it is possible to have pluralization of the jets and glass orifices in the lateral, or cross stream, sense as well as in the upstream - downstream sense, and 32A, 32B and 32C may therefore represent lateral rows of jet orifices, rather than representing single orifices. Each of the secondary jets and its associated orifice for emitting attenuable material functions as an independent fiberizing center. Thus, the secondary jet emitted from orifice 32A interacts with the portion of the blast in immediate proximity thereto, giving rise to a localized zone of interaction into which attenuable material from orifice 33A is introduced in a manner consistent with the explanation offered with respect to FIG. 2 of drawings.

INTRA-AXIAL SPACING RANGE

It has been found that in order for fiberization to proceed effectively at plural fiberizing centers such as are disclosed in connection with FIG. 3A, certain spacing guidelines must be observed. One of the more important considerations concerns the minimization of the intra-axial distance, i.e., the separation, in the upstream - downsteam direction, between a secondary jet orifice and the associated orifice for feeding attenuable material. It has been found that best results are obtained when the intra-axial distance does not exceed 1 to 2 times the diameter of the secondary jet orifice.

TRANSVERSE AND UPSTREAM-DOWNSTREAM INTER-AXIAL SPACING RANGE (PART A)

Important spacing guidelines must also be followed with respect to the inter-axial distances between fiberizing centers. There are two different inter-axial distances involved, one of which, the "lateral inter-axial distance," relates to the distance between fiberizing centers in a sense crosswise to the blast, and the other of which, the "successive inter-axial distance," relates to the distance between fiberizing centers taken in the upstream - downstream sense. The minimum lateral inter-axial distance between fiberizing centers is on the order of 2 to 3 times the diameter of a secondary jet orifice, while the minimum successive inter-axial distance between fiberizing centers is on the order of 7 to 10 times the diameter of a secondary jet orifice, except for staggered or offset arrangements discussed below.

In the embodiment of FIG. 3A, the desired ratio of secondary jet kinetic energy to principal jet kinetic energy has been maintained by successively reducing the velocities of the secondary jets at those fiberizing centers more distant from the origin of the blast.

However, the successive reductions in jet velocities tend to result in the projection of coarser fibers, a result which is not desirable. Accordingly, in operating an embodiment such as is shown in FIG. 3A, a substantially uniform average fiber diameter from the various fiberizing centers can be obtained by reducing progressively the orifice pull rate, center by center in a downsteam direction. This can be done in various ways, such as, by reducing the glass orifice size, or by reducing the temperature of the crucible wall in the vicinity of this orifice.

An effect similar to that described above with reference to FIG. 3A can be achieved by employing downstream jet orifices of successively reduced size as compared with upstream orifices, instead of using jets of different velocities.

Jets of successively reduced size may also be used with glass orifice means in the form of glass slots, as more fully described below in connection with FIGS. 13A and 13B. For example, in an installation such as shown in FIGS. 13A and 13B, having three rows of fiberizing centers, the diameter of the jets in row 106A, i.e., the upstream row, may be 2.4 mm, the diameter of row 106B may be 2.2 mm, and that of row 106C may be 2.0 mm.

The glass orifices of upstream and downstream fiberizing centers may also be similarly graduated in size when jets of different size are used in upstream and downstream fiberizing centers. For example, in an installation having two rows of fiberizing centers the jets of the upstream and downstream centers are 2 mm and 1.5 mm in diameter. The upstream and downstream centers are respectively supplied with glass from glass orifice slots (as in FIGS. 13A and 13B further described hereinafter), the upstream slot being 1.5 mm in width and the downstream slot being 1 mm in width.

Figure 3:
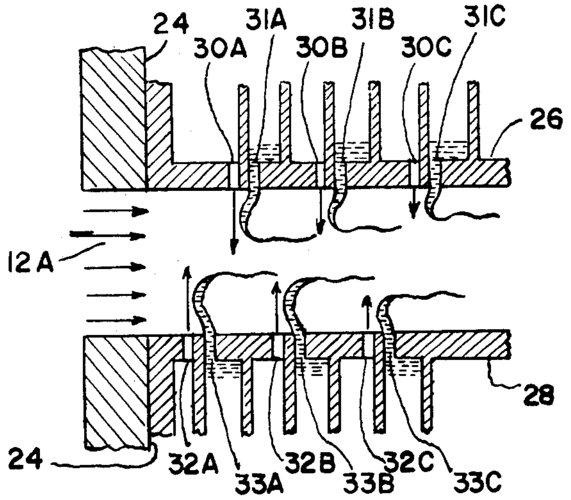
FIG. 3 is a fragmentary sectional view showing an embodiment in which a plurality of fiberizing centers are provided, these being arranged in successive rows and also on opposite sides of the blast.
Figure 3A:
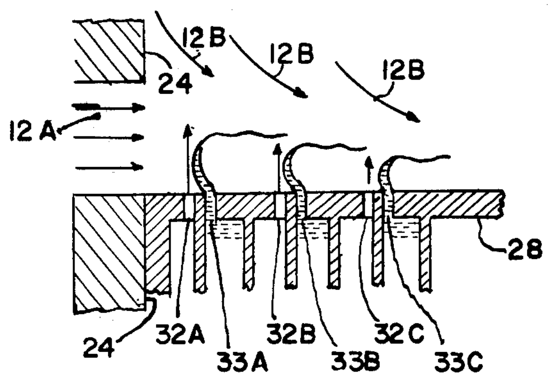
FIG. 3A is a fragmentary sectional view showing another embodiment in which a plurality of fiberizing centers are provided, these being arranged in successive rows, similar to the lower portion of FIG. 3.
Figure 4:
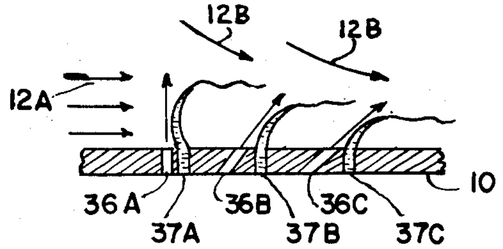
FIG. 4 is a fragmentary sectional view of another embodiment incorporating a plurality of fiberizing centers and showing a special arrangement which aids in avoiding having the upstream centers interfere with the fiberizing centers located downstream thereof.

When using jet orifices of successively reduced size, as just described, the lengths of the glass cones will be progressively less, in downstream direction, as is illustrated in FIGS. 3, 3A and 4. When utilizing a set up in which both the jet orifices and the glass orifice means are successively reduced in size, the cones will not only be of successively reduced length, but also of successively smaller section.

Since the blast successively steps down in kinetic energy as successive fiberizing centers are passed, the total number of successive fiberizing centers which can be serviced by a given blast is limited by the cumulative resistance offered by the fiberizing centers to the flow of the blast.

FIG. 3

Another means for increasing the number of fiberizing centers is shown in FIG. 3. Therein is disclosed an embodiment of the invention having a principal jet, or blast, generally depicted by the feathered arrow 12A, shown as being emitted through an orifice comprising lips 24, which orifice may be part of an internal combustion chamber. It is here mentioned that the blast for use in the present invention may be such as is described in the aforementioned U.S. Pat. to Battigelli, No. 3,544,254.

The embodiment shown in FIG. 3 differs from that of FIG. 3A by the presence of a second wall 26 similar in construction to and facing wall 28. To the extent possible, the same reference numerals are used in FIGS. 3 and 3A.

The blast is constricted to a path defined essentially by the two opposing walls 26 and 28. The walls 26 and 28 are equipped with a plurality of secondary jet orifices 30A, 30B and 30C and 32A, 32B and 32C, respectively spaced from each other in an upstream - downstream sense, together with a corresponding number of orifices for emitting attenuable material 31A, 31B and 31C, and 33A, 33B and 33C. Although not appearing in FIG. 3, it is possible to have pluralization of the jet and glass orifices in the lateral, or cross stream, sense as well as in the upstream - downstream sense, and 30A, 30B, 30C, 32A, 32B and 32C may therefore represent lateral rows of jet orifices, rather than representing single orifices. Each of the secondary jets and its associated orifice for emitting attenuable material functions as an independent fiberizing center. Thus, the secondary jet emitted from an orifice 30A interacts with the portion of the attenuating blast in immediate proximity thereto, giving rise to a localized zone of interaction into which attenuable material from an orifice 31A is introduced in a manner consistent with the explanation offered with respect to FIG. 2 of drawings.

It is pointed out that the glass and secondary jet orifices located in walls 26 and 28 may be longitudinally offset (as shown in FIG. 3) instead of directly facing each other, to provide a maximum number of orifices without appreciable interference of one fiberizing center with another.

FIG. 4

As shown in FIG. 4, effective fiberizing and fiber cooling may also be aided by introducing each successive secondary jet at a slightly smaller angle with respect to the blast than the angle of the jet just upstream from it. The successive secondary jet orifices 36A, 36B and 36C are oriented to direct the jets at progressively flatter angles. Notwithstanding the fact that the kinetic energies per unit of volume of the secondary jets can be all the same, their depth of penetration differs for the succcessive glass orifices 37A, 37B and 37C at the successive fiberizing centers. As a result of the differential orientation, each succeeding zone of interaction is located progressively closer to the surface of the plate 10.

FIG. 5

Figure 5:
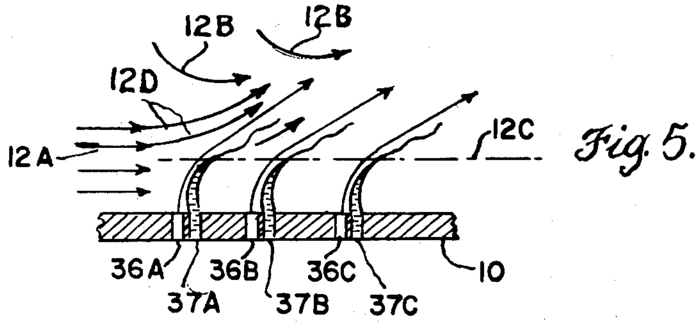
FIG. 5 is a fragmentary sectional view, similar to FIG. 4, showing another embodiment having plural fiberizing centers, this view illustrating another arrangement for aiding in avoiding having the upstream centers interfere with the downstream centers.

The embodiment shown in FIG. 5 makes possible the utilization of a greater number of fiberizing centers in the upstream - downstream direction, while maintaining effective fiberizing and fiber cooling. In FIG. 5 the dot and dash line 12C indicates the approximate level, along the blast 12A, at which the end of Zone III of each fiberizing center occurs.

As shown by the blast flow arrows **12*d* in FIG. 5**, in this embodiment the blast is deflected somewhat during the interaction with the jets. In other words, the deflection into downstream direction, as discussed above in connection with various other embodiments, is partly accomplished by deflection of the jets and partly accomplished by deflection of the blast. The main point to be kept in mind is that the jets penetrate deeply into the blast.

INTER-AXIAL SPACING RANGE (PART B) (WITH STAGGERED CENTERS)

As mentioned above, each of the orifices depicted in FIGS. 3, 3A, 4 and 5, may represent only one of a plurality of orifices in a lateral row. Such multi-hole rows are depicted in the FIGS. 13 and 14 series of drawings described more fully hereinafter. In these latter embodiments it is disclosed that the orifices in successive rows may be offset, or out of alignment in the upstream - downstream sense, to provide a greater density of fiberizing centers without concern that an upstream fiberizing center will have diminished the velocity of the blast to such an extent that fiberization cannot proceed at the next succeeding jet. While, as mentioned, the minimum successive inter-axial separation between fiberizing centers is generally 7 to 10 secondary jet orifice diameters, a separation between successive rows which is reduced may be used in arrangements where the succeeding rows of orifices are offset. Thus the separation between one row and the next succeeding and offset row is about 4 to 5 diameters.

Apart from the offsetting just described, a staggering on opposite sides of the blast in the embodiment of FIG. 3 is desirable. Thus, the fiberizing centers emanating from plates 26 and 28 are not directly opposite each other, but are staggered in the direction of flow of the blast, so as to avoid any adverse inteference.

FIGS. 6 AND 7

Figure 6:
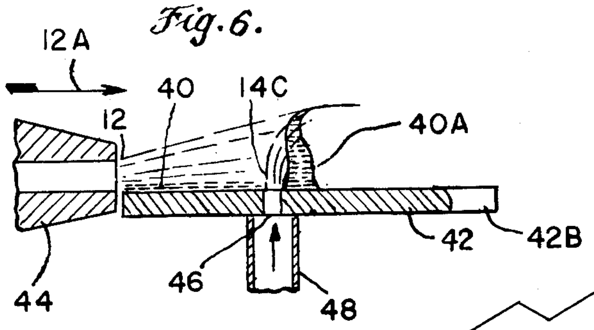
FIGS. 6 and 7 represent sectional and isometric views, respectively, of an alternative method of supplying attenuable material to a system operative in accordance with the principles of the present invention.
Figure 7:
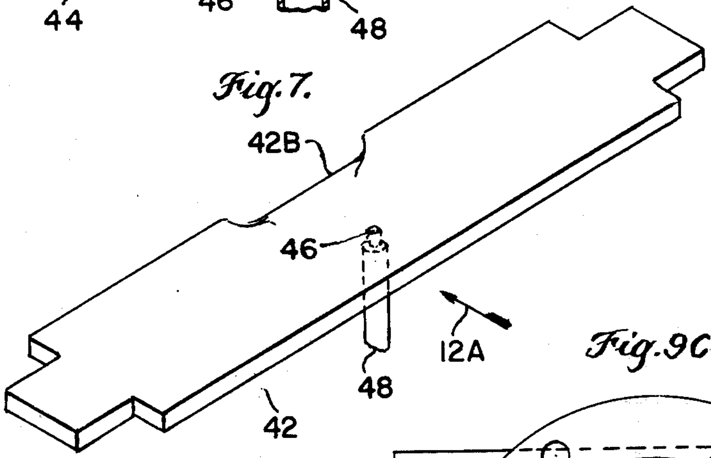

Turning now to FIGS. 6 and 7, therein is shown an alternative arrangement for producing fiber in accordance with the principles of the present invention. In this embodiment, the attenuable material 40 is supplied to the surface of the plate 42 in the form of small granules of glass. The glass granules are heated to the molten state by resistively heating the plate 42 by conventional electrical means not shown. After being melted, the glass moves under the influence of the blast 12 emanating from the burner mouth 44, to the downsteam side of the jet 14C where the glass collects in the form of a cone 40A.

From the position of localization immediately downstream of the jet, the molten glass is drawn into the zone of interaction of the blast and the jet and is torated in a manner consistent with the explanation of FIG. 2 of drawings.

The plate 42 is provided with a cutaway section 42B downstream of the fiberizing point, which is a useful expedient in precluding the possibility that the attenuable material, while still in the molten state, will stick to or become attached to the plate due to the violent whipping action experienced by the fiber.

FIG. 8

Figure 8:
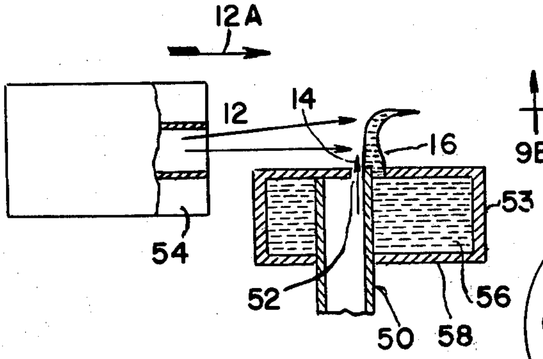
FIG. 8 represents another arrangement for supplying attenuable material to the zone of interaction between the jet and blast employed.

Turning now to FIG. 8, therein is disclosed still another alternative arrangement for practicing the present invention in which a secondary jet is fed via a conduit 50 to an orifice 52 and from thence into a primary jet 12 emanating from a burner 54. The secondary jet 14 being emitted from the orifice 52 partially intercepts the principal jet and is totally encompassed thereby, so that the zone of interaction explained above is established.

The attenuable material 56 emerges from the tank 58, via an orifice, as the cone 16 in the zone of interaction established between the principal and secondary jets.

FIGS. 9A-B-C

Figure 9C:
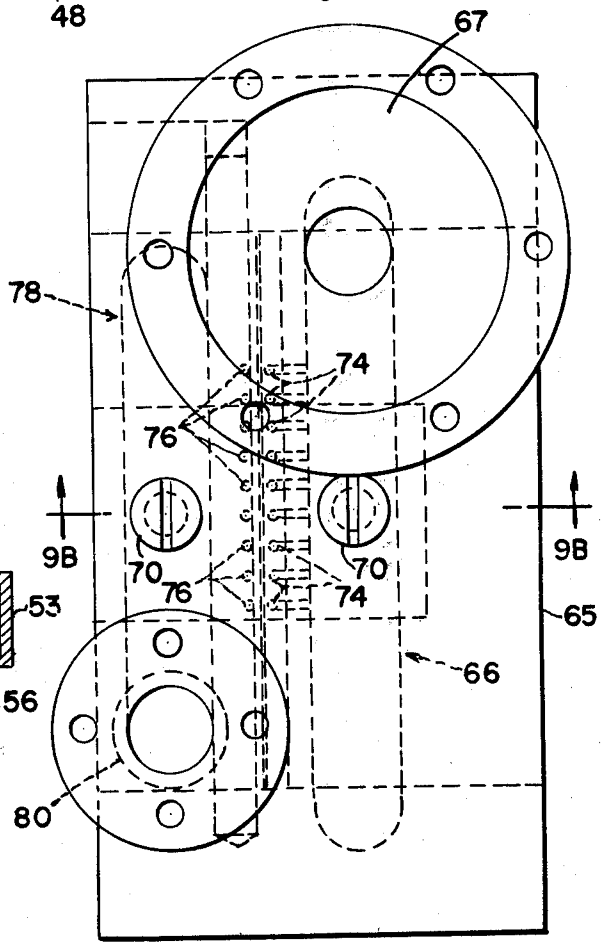
FIGS. 9A, 9B and 9C show still another embodiment of apparatus for manufacturing fibers in accordance with the principles of the present invention, FIG. 9A showing the general arrangement, FiG. 9B showing certain parts in enlarged section taken as indicated by the section line 9B on FIG. 9C, and FIG. 9C being an enlarged plan view of the parts shown in FIG. 9B.
Figure 9A:
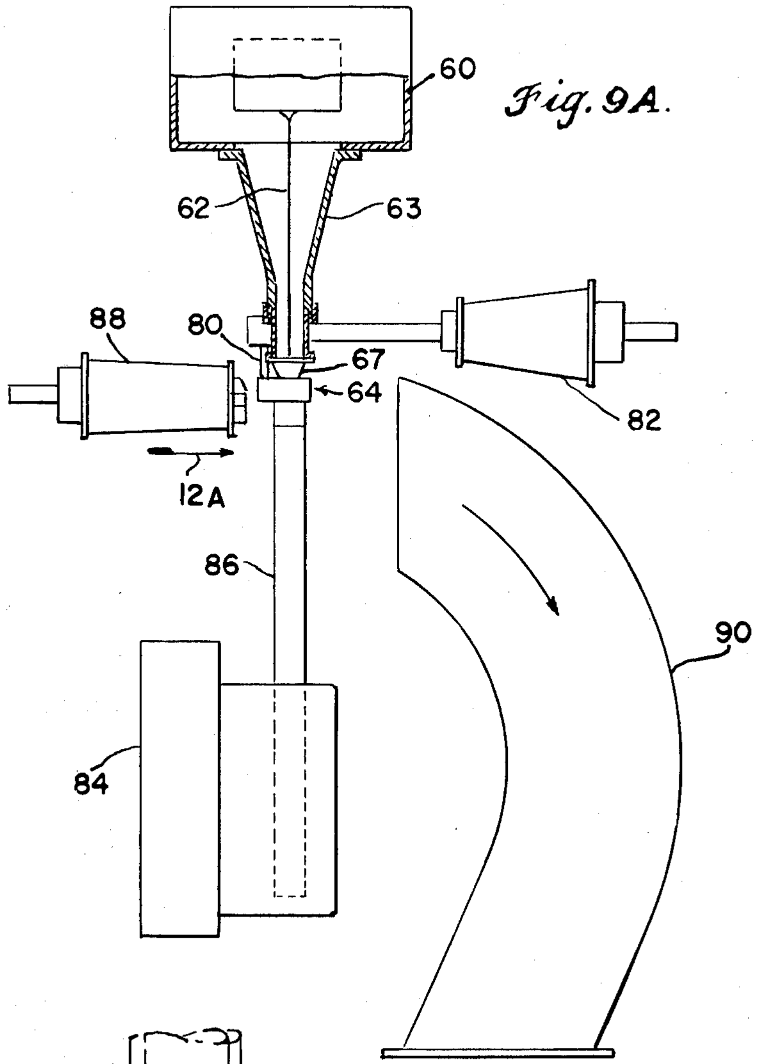
Figure 9B:
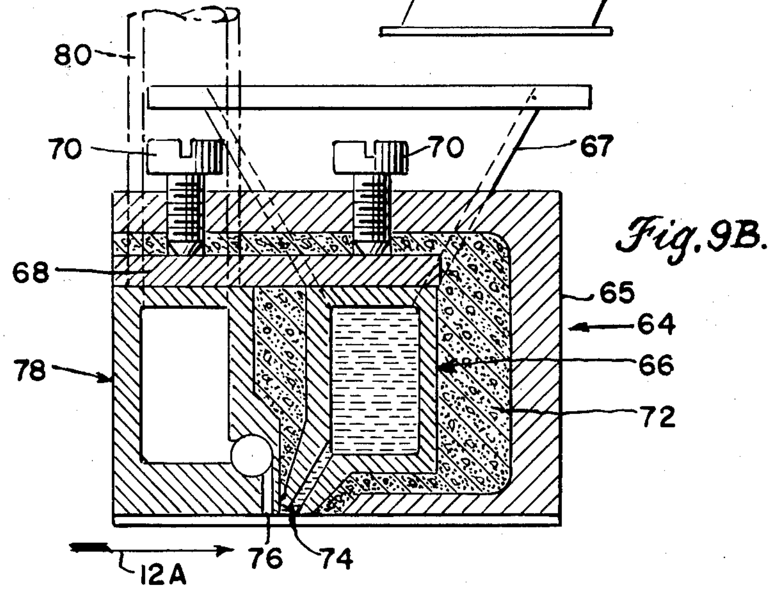

Turning now to FIGS. 9A, 9B and 9C, therein is disclosed still another apparatus for manufacturing fibers in accordance with the principles of the present invention. The equipment comprises a resistively heated melting crucible 60, which alternatively may comprise a bushing supplied by a forehearth of a conventional glass batch melting furnace.

A stream of attenuable material 62 is emitted from the melting crucible 60 and is shielded by member 63 as it flows to a fiberizing station indicated generally in FIG. 9A as number 64. As seen in the sectional view of FIG. 9B, the steam of attenuable material 62 is fed into a bushing crucible 66 by means of a funnel shaped hopper 67. The crucible 66 is secured in position within the housing 65 by means of a clamping block 68, the latter being in turn rigidly secured to the housing 65 by way of clamping screws 70. The crucible 66 is insulated with respect to the housing 65 by means of an asbestos packing material 72. Although asbestos is used because of its very high insulating characteristics, other materials including refractory material may be substituted therefor.

Leading from the base of the crucible 66 to the base of the housing 65 are a plurality of narrow conduits terminating in orifices 74, each having an internal diameter on the order of 2mm. These conduits serve to supply attenuable material to the immediately downstream side of a like number of secondary jets, emanating from orifices 76, where the material can be drawn into the zone of interaction of the secondary and primary jets in the manner outlined above with respect to FIG. 2 of drawings.

The carrier jet orifices 76 are supplied with heated air under pressure, or products of combustion, from the chamber 78, which in turn is supplied, via tube 80, from the jet generator 82 shown in FIG. 9A.

As is noted particularly with respect to FIG. 9C, there are nine glass orifices 74 in the crucible 66, these being positioned immediately adjacent a like number of carrier jet orifices 76. As discussed above in connection with Zone I, some slight misalignment of a given glass orifice with respect to its associated carrier jet orifice will not substantially impair fiberization because of the localization of the glass in the low pressure region immediately downstream from the jet. However, such misalignment is disadvantageous in the multiple-hole-per-row embodiments in which precise lateral spacing between fiberizing centers is desirable, and because a slight difference in the lateral inter-axial distance separating adjacent carrier jets or attenuable material orifices may be compounded over the multiple fiberizing stations.

If misalignment becomes too great, it may result in a failure of the attenuable material to localize behind the carrier jet at a particular fiberizing center.

Misalignments may be the result of poor assembly techniques, or machining, in the preparation of the crucible 66 and chamber 78, but can also be caused by temperature differences.

Temperature differences may contribute to misalignment in several ways. In setting up the design of equipment generally in accordance with the embodiment of FIGS. 9A, 9B and 9C, it is frequently desirable to establish substantially the same target temperature for the operation of the glass crucible 66 and the jet chamber 78. Such design would dictate certain hole spacings for the holes in the crucible and for the holes in the chamber, depending on the materials from which the crucible and chamber are constructed, so that, under the intended operating conditions, the holes in the crucible and chamber would be exactly aligned with each other. However, if the same equipment is used under different operating conditions, thermal expansion to a degree not accounted for in the design could cause misalignment. Further, operating equipment of such design under conditions such that the crucible and the chamber are at significantly different temperatures, could again, because of differential thermal expansion, cause misalignment.

Still further, misalignment may be caused by nonuniform temperature along the length of the row of holes in the crucible, or along the length of the row of holes in the chamber, or both.

FIGS. 12 AND 12A (PART A)

A means to avoid the consequences of a misalignment between the secondary jet orifices and the glass orifices is shown in FIGS. 12 and 12A in which the row of glass orifices is replaced by a continuous slot located immediately downstream of the secondary jet orifices. The longitudinal axis of the slot is coincident with what would be the transverse center line of a row of glass orifices, if such a row were to be used.

We have observed that in such an embodiment, contrary to what might be expected, no glass sheet emerges from the slot. Instead the glass is divided into a series of cones, with one cone located exactly downstream of each secondary jet. The bases of these cones are linked together by a continuous surface of glass, shown in FIG. 12A which surface is slightly curved in direction opposite to the projecting cones.

This surprising phenomenon is mainly due to the distribution of pressures along a line parallel to the bottom of the crucible 103 and perpendicular to the blast and located immediately downstream of the row of secondary jets. Along this line, pronounced negative pressure zones develop downstream of each secondary jet and in between these negative pressure zones, there is the dynamic pressure of the blast flowing between the secondary jets. The described pressure distribution forces the glass to flow into the negative pressure zones. The glass surface tension reinforces and stabilizes the hereabove described effect, and thus contributes to the surprising phenomenon. Accordingly, the slot achieves a selfcentering of the emission points of the glass.

In an embodiment as disclosed in FIGS. 9A, 9B, and 9C, the bushing crucible 66 may be constructed of steel, but even if special stainless steels having the best available high temperature properties are used, crucibles made of this material have a limited temperature tolerance on the order of 1100° C. At temperatures above about 1100° C warpage may be introduced into the surfaces of the steel crucible, disrupting the sensitive alignment of the secondary jets and the glass supply orifices. There would thus be an effective upper limit on the temperature at which the attenuable material may be introduced into the fiberizing zone.

When torating glass, better operating conditions, particularly higher pull rates, and better fiber characteristics can be achieved when the temperature of the glass contained in the crucible, and consequently the temperature of the crucible itself, are higher than the previously indicated limit of 1100° C.

GLASS TEMPERATURES (PART A)

GLASS COMPOSITION

There are two parameters influencing the flow of the attenuable material through the orifices as well as the attenuation, and certain fiber characteristics, these two parameters being the material temperature, or the material formula, or both simultaneously.

As a first example, glass output through an orifice increases when the glass viscosity decreases; but the viscosity decreases when the temperature increases and for a given temperature, depends on the glass formula.

As a result, some glasses are called "soft", meaning that their viscosity is low, and others are called "hard" because, when at the same temperature as the soft ones their viscosity is much higher. Generally speaking, hard glasses are less expensive than soft glasses.

A second example of the influence of the attenuable material temperature is in relation to glass devitrification, which is the phenomenon by which glass crystals appear spontaneously in a glass mass in a molten state. The growth velocity of these crystals depends on the glass temperature and formula. There is a temperature above which all the crystals are melted and this upper temperature of devitrification is called the glass "liquidus."

When numerous enough, the devitrification crystals tend to block up the orifices through which glass is flowing. Accordingly, it is important to work at a temperature higher than the upper temperature of devitrification, or liquidus, that is to say, at high temperatures.

A third example is in connection with fiber resistance to high temperatures. This resistance is essentially a function of the glass formula.

Generally speaking, fiber resistance to high temperatures, viscosity, and liquidus, vary in the same direction when changing the formula and increase when going from soft glasses to hard glasses.

As another example of the influence of the attenuable material temperature, the specific calorific consumption of the jets, which can be measured in kilocalories per kilogram of fiberized glass, is also dependent upon the glass formula and the temperature at which the glass is introduced into the torating zone.

Thus, for a given attenuating energy, the lower the glass viscosity in the attenuating zone, that is, the higher the glass temperature, the more effective is the glass attenuation.

High temperature is imparted to the glass partly in the crucible, and partly in the torating zone by the high temperature of the torating flow. Accordingly, to minimize the specific calorific consumption of the jets, it is desirable to arrange for a flow of glass at very high temperature at the glass orifice discharge.

Consequently to utilize hard glasses, to get high orifice pull rates, to prevent blockages of glass orifices, and to minimize the specific calorific consumption of the jets, it is highly advantageous to maintain the attenuable material in the crucible at temperatures higher than the limit temperature of the crucible hereabove mentioned in connection with embodiments, such as are illustrated in FIGS. 9A, 9B and 9C, when steel is used for the crucible.

For this reason, we prefer to use materials which are resistant to very high temperatures, such as platinum alloys, or refractory oxides, in the construction of the jet chamber and the glass crucible.

The following is an example of a hard glass formula which can be fiberized according to the present invention.

| | |
|---|---|
| $SiO_2$ | 46.00% |
| $Al_2O_3$ | 9.00% |
| $Fe_2O_3$ | 1.20% |

-continued

| | |
|---|---|
| FeO | 0.40% |
| CaO | 32.00% |
| MgO | 3.50% |
| $K_2O$ | 2.90% |
| $Na_2O$ | 5.00% |

GLASS ORIFICE SIZE

In general, the hotter the glass temperature selected, the lower the viscosity of the molten glass, and the smaller will be the orifice through which such glass will pass. However, the high temperature strength of the material from which the glass crucible is constructed will indicate practical upper limits to the temperature of the glass which can be employed. There is thus, in turn, a minimum orifice size through which the glass will pass when at a temperature not so high as to cause the glass crucible to fail. We have found that good conditions for toration can be established with glass orifice sizes in the range of from about 1 to about 3 mm.

In the embodiments of the present invention having multiple laterally spaced fiberizing centers, including the embodiment of FIGS. 9A, 9B and 9C, some difficulty has been experienced with respect to fiberizing at centers at the extreme ends of a row. The fibers produced from end orifices tend to stick to parts of the fiberizing equipment. Although it is possible to improve the quality of the fibers being produced at the end holes by adjusting the relative velocities of the carrier jets and the blast, this usually results in a deterioration of the quality of the fibers produced at the other fiberizing centers, i.e. at those central of the end holes. In order to correct this problem, we have found that it is of advantage to provide one or more extra jet orifices at each end of the row. This teaching is specifically disclosed in the embodiment of FIG. 12, to be discussed herebelow.

The provision of supplemental, or extra, jets at the ends of the rows has the effect of establishing a symmetrical pattern of flow, because, with the extra holes in operation, each of the carrier jets which has a glass hole to pull on has a jet blowing out on both sides of itself.

GLASS TEMPERATURES (PART B)

As mentioned above, the temperature of the glass, for some glass compositions, is preferably maintained above 1250° C; however, in the embodiment of the invention described above with reference to FIGS. 9A, 9B and 9C, if a stainless steel crucible and chamber are used, an upper glass temperature limit of 1100° C is imposed by the stainless steel. The stream of glass 62 flows from the melting crucible 60 at a temperature of approximately 1260° C, but, in transit, loses heat so that it is on the order of 1070° C by the time it reaches the bushing crucible 66. The temperature of the glass in the crucible 66 is maintained at the desired value by means of a crucible heater and an electric transformer, identified in FIG. 9A as member 84, supplying energy to the crucible 66 by way of the bus bars 86. In addition to heating the attenuable material inside the crucible 66, the heat generated by transformer 84 is also effective in maintaining the temperature of the carrier jet, from the generator 82, at a value which is optimum for fiberizing purposes. In some cases the temperature of the pressurized fluid resulting from the generator 82 may have to be reduced. In such event, the heated fluid in tube 80 may be diluted with cold compressed air, or alternatively a simple form of heat transfer mechanism (not shown), such as a fluid circulator, may be positioned in heat transfer relationship with the tube 80 to reduce the temperature of the secondary jet to the desired level.

The burner 88 in FIG. 9A serves as means for establishing the principal blast. The burner 88 is shown oriented so that the flow of the output gases therefrom is parallel to, and sweeping against, the under surface of member 64. The burner 88 may be mounted so that it can be raised or lowered slightly, and also tilted slightly, up or down, for example about 3°, to vary the position and angle at which the blast is projected toward the plate. We have found that the burner 88 is preferably oriented so that the gases are emitted parallel to the plate and sweeping against it, but may also advantageously be tilted so that the hot gases from the burner are directed slightly toward, and therefore forcefully lick, the under surface of the assembly composed of the chamber 78, the crucible 66 and the housing 65, all three of which are preferably arranged so that their bottom surfaces are aligned to, in effect, constitute a plane or plate.

Orienting the burner 88 at the undersurface of the housing 65 enables the controlled transfer of heat energy thereto which serves to raise the temperature of the crucible 66 and chamber 78. An alternative manner of effecting heat transfer to the underside of the housing 65, and thence to the crucible 66 and chamber 78, is to raise the upper lip of the burner 88 slightly above the level of the bottom of housing 65 so that a portion of the blast is played directly against the housing 65. In effecting heat transfer to the crucible and chamber via the latter method, care must be exercised to see that there is no undesirable disruption to the pattern of fluid flow around the orifices 74 and 76. We have found that good results are obtained when the burner 88 is not raised at all, or, when raised, that the upper lip of the burner 88 is raised only by an amount not exceeding 1.5 mm above the position at which no blast impinges directly upon the sidewall of the housing 65.

The physical parameters defining the mouthpiece of the burner 88 are important to the practice of the present invention in that the lips of the burner must be as close as possible to the plane of emission of the secondary jet and the attenuable material, and at the same time the separation between the upper and lower lip must be sufficiently wide to insure that the cone of attenuable material will be totally enveloped by the torating flow.

An additional consideration concerns the desirability of minimizing the consumption of heat energy, and thus of fuel, in the performance of the process, and an advantageous way of achieving this is by adjusting the width of the slot between the burner lips to the minimum possible while still achieving the above results. An additional consideration respecting heat consumption is the spacing of the fiberizing center from the lips of the burner. From the standpoint of conservation of heat, the closer the lips are to the fiberizing center, the better the result because there is reduced opportunity for heat loss by convection, radiation and conduction. However, the lips of the burner cannot be right against the fiberizing center because there would then be a risk that there would be disruptive eddy currents which would interfere with the process. We have found that good results are obtained when this distance is quite small, for example, below about 25 mm, and preferably below about 10 to 15 mm.

Chute 90 in FIG. 9A is a hollow member, conveniently of rectangular cross-section, which guides the torated fibers to a conveyor system (not shown) where they may be collected, arranged and moved to a packing or further processing station.

It will be noted that the section line 9B, as shown on FIG. 9C, is taken in a position such that the hot air supply tube 80 is not visible in FIG. 9B. However, for the sake of clarity of presentation, tube 80 is indicated in FIG. 9B in dot and dash lines.

The whipping action of the fibers, as fully described in connection with the above discussion of the zones of toration, sometimes causes a fiber to touch against various parts of the equipment, particularly the plate through which the attenuable material is emitted and especially in the region thereof downstream of the fiberizing center. If the equipment so touched by the fiber is hot, there may be a tendency for the fiber to stick, in which case a length of fiber may melt and drop into the product as a piece of unfiberized material.

Figure 10:
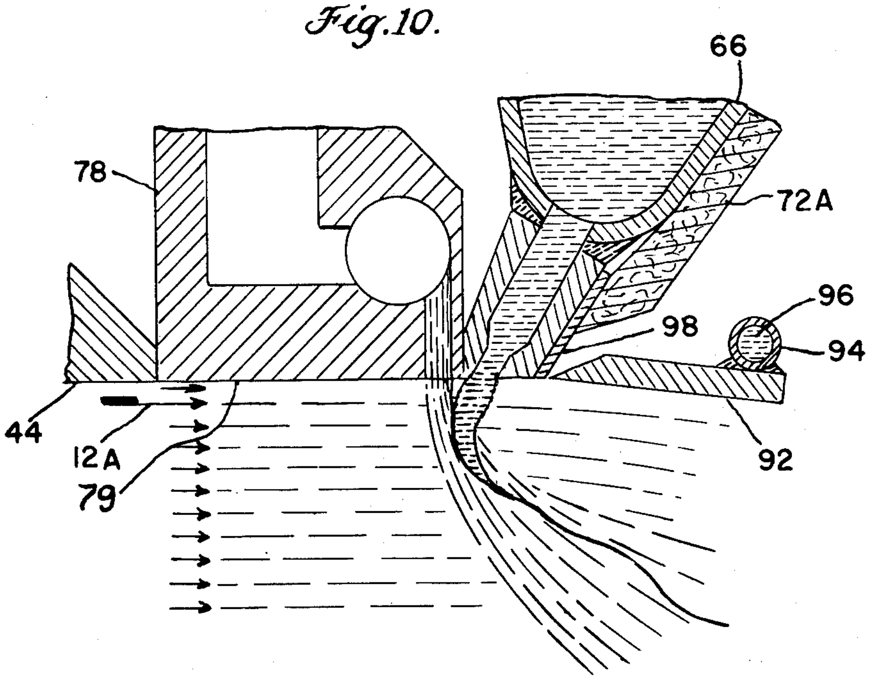
FIG. 10 is a sectional view of another embodiment, in which a water cooled plate is utilized adjacent the path of the blast downstream of the fiberizing center.
Figure 11:
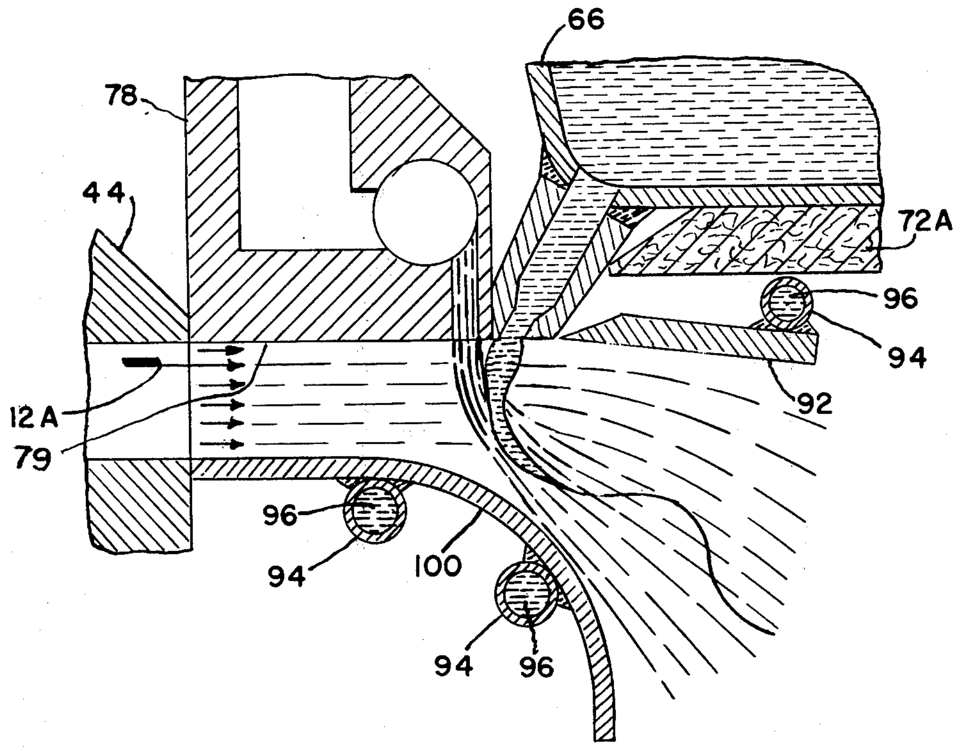
FIG. 11 is a view similar to FIG. 10 but further showing the use of a water cooled deflector adjacent the side of the gas blast opposite to the fiberizing center.

Certain provisions for minimizing such risk of the sticking of fibers, and also for avoiding undesirable cooling of the bottom of the crucible, are illustrated in FIGS. 10 and 11, which show alternative embodiments also incorporating still other features, as will be seen from the following.

FIG. 10

The arrangement of FIG. 10 includes a downstream metal plate 92 having a cooling tube 94 mounted in heat transfer relation to the plate in order to provide for circulation of a cooling liquid 96. The plate 92 is advantageously formed of a metal having good heat conduction characteristics, for instance copper. With this arrangement, even if the whipping action of the fibers being formed brings the fibers into contact with the surface 92, the fibers will not have a tendency to stick and build up because of the fact that the surface is cooled. An arrangement of this kind aids in avoiding possible accumulation of fibers on the surface of the equipment.

With further reference to FIG. 10, the burner lips are indicated at 44, and a carrier jet chamber is indicated at 78, the glass crucible being shown at 66 as in FIGS. 9A, 9B and 9C. However, in FIG. 10 an asbestos board 72A is applied to the crucible 66 in a position to aid in minimizing heat loss, thereby maintaining the desired crucible and glass temperature especially in the region of feed of the glass to the glass supply orifice. Such an insulating shield may be employed in a position more or less directly exposed to the blast, but in installations having a blast defining wall element or surface which is cooled, such as the downstream plate 92, the plate is interposed between the gaseous flow and the shielded crucible.

The plate 92, however, is extended in the upstream direction to a point relatively close to the glass supply port, and in order to avoid excessive cooling of the glass adjacent to the discharge orifice, a protective shield of mica indicated at 98 may be introduced. The plate 92 may be oriented, with respect to the plane of the bottom wall 79 of chamber 78, that is, the plane of emission, at a slight angle, as shown. We have found that an angle of between about 3° and about 20° is appropriate, and we prefer an angle in the lower end of this range.

FIG. 11

A similar arrangement of components is shown in FIG. 11, but in FIG. 11 there is further illustrated a lower deflector 100 arranged at the side of the blast opposite to the fiberizing center and preferably curved downwardly in the region opposite to the fiberizing center. This deflector 100 is also desirably provided with pipes 94 in heat exchange relation to the deflector and serving to carry a coolant 96 so that in the event that the whipping action of the fiber causes it to touch the deflector 100, the fiber will not stick to the surface of the deflector.

With respect to the wall elements 92 and 100, it is to be noted that these elements aid in deflecting the flow of gases, particularly downstream of the fiberizing center, and this aids in stabilizing toration, as well as in reducing the risk of the fibers adhering to the surfaces of the equipment.

A noticeable difference in the posture of the cone of attenuable material is observed, particularly when the lower deflector 100 is employed. In the latter case, the tip of the cone of attenuable material appears to project more directly into the core of the blast.

The downstream plate 92 and the lower deflector 100 constitute effective means for guiding and stabilizing the flow resulting from the interaction of the two jets, more or less independently of the velocities of the jets, which makes possible the production of a fiber of highly constant quality. In other words, the downstream plate 92 and deflector 100 constitute means for broadening the range of conditions under which successful operations can be performed for favorably influencing the quality of the fibers produced, although it is pointed out that other embodiments of the equipment are also capable of producing high quality fibers, without the use of such plates or deflectors.

Multiple fiberizing centers are desirably provided in order to maximize production with given equipment and one arrangement for achieving the multiplication of the fiberizing centers is to provide one or more series of fiberizing centers spaced from each other in a zone extended transversely or laterally of the blast.

FIGS. 12 AND 12A (PART B)

Another system for achieving the lateral or transverse multiplication of the fiberizing centers is illustrated in FIGS. 12 and 12A. Note that in FIG. 12A the right hand three jets are indicated as extending downwardly a considerable distance whereas the other jets are shown as being quite short. This is for reasons of simplicity and clarity only. In actual practice all of the jets would be substantially as shown in the FIG. 2 series of drawings.

In FIG. 12 the equipment is arranged so that there is virtually no plate, or at least a plate of quite limited dimension, and the influence of the plate is therefore quite small.

In this arrangement a crucible 103 is provided with a glass orifice in the form of a slot 104 which is elongated transversely of the blast. Upstream of the slot a manifold or chamber 106 is provided, having a transverse series of carrier jet orifices 106D positioned close to the slot 104, the manifold being provided with one or more connections such as indicated at 75 for supplying the jet fluid.

As herein above mentioned, in the arrangements of FIGS. 12 and 12A the several jets delivered from the orifices establish the fiberizing centers as a result of the localized influence of each jet upon the molten glass at the lips of the slot 104. In consequence of this action, instead of discharging a continuous sheet or curtain of glass, the glass discharging from the orifice slot is localized in zones immediately downstream of each of the carrier jets, thereby providing individual glass cones which, in cooperation with the individual carrier jets constitute individual fiberizing centers. This effect is clearly indicated in FIG. 12A, but it also occurs in the operation of the equipment of FIG. 12.

As seen in FIG. 12 it is desirable that the series of jet orifices 106D include at least one jet orifice located beyond each end of the slot 104, this being of importance in order to avoid deleterious end effects, as described above.

In a typical arrangement employing a glass orifice in the form of a slot, the width of the slot may desirably be about the same as the disclosed jet orifice diameter, that is about 1 to 3 mm, this dimension being a function of the viscosity of the attenuable material under normal fiberizing conditions.

An advantage of using a slot for the emission of the glass is to avoid the consequences of a misalignment of the glass orifices and secondary jet orifices, as mentioned above.

Still another advantage in using a slot is that it provides self regulation of glass pull rate and attenuation for each cone. We have found that glass pull rate is proportional to the width of the slot and to the secondary jet diameter, provided said slot width does not exceed the length of the recirculation zone, measured in downstream direction from the secondary jet. As already stated such length of the recirculation zone is proportional to the secondary jet orifice diameter and to the ratio between the kinetic energies of the blast and of the jet. Additionally, the jet speeds must be high enough to attenuate the amount of glass pulled.

When the characteristics of one transversal row of secondary jets are uniform, i.e. when orifice diameters, jet velocities and temperatures are the same, glass pull rates will also be uniform, each fiberizing center attenuating the same amount of glass.

When the characteristics of the jets along a given lateral row of jets differ, particularly jet hole diameter, pull rates will automatically adjust to the actual conditions.

For large scale operation it is important to provide for simultaneous operation of a large number of fiberizing centers. Further, the density of the fiberizing centers should also be high in order to maximize the ratio of the amount of fibers produced to the amount of energy used and to decrease investment cost by reducing the number of manufacturing units.

FIGS. 13A-B

One embodiment of equipment adapted to achieve the above objectives is illustrated in FIGS. 13A and 13B. In FIG. 13A the blast is indicated as being confined between walls, including a plate 92 and a curved deflector surface 100, which may be of construction as described above in connection with FIGS. 10 and 11.

The embodiment of FIGS. 13A and 13B includes a crucible 103 which is substantially enlarged as compared with certain of the preceding embodiments and which is provided with glass delivery slots 104A, 104B and 104C. Multi-orificed jet supply chambers 106A, 106B and 106C are positioned within the crucible 103 and each of these chambers is provided with a series of orifices to provide carrier jets close to but upstream of the glass supply slots. As seen in FIG. 13B the carrier jet orifices of each of the supply chambers 106A, 106B and 106C are staggered upstream and downstream of the blast, in order to minimize interference between fiberizing centers.

It is also contemplated in the embodiment of FIGS. 13A and 13B that the transverse series of carrier jet orifices include at least one orifice supplying a jet at each end beyond the glass feed slot, in order to provide for uniformity of operation of all of the active carrier jets in each series. The embodiment of FIGS. 13A and 13B is still further characterized by a set up which is advantageous in at least certain operations in which it is desired to establish a carrier jet temperature very close to the temperature of the molten glass. The disposition of the jet supply chambers within the crucible assists in equalizing the jet and the glass temperatures.

INTER-AXIAL SPACING RANGE (PART C)

VELOCITY AND ENERGY OF BLAST AND JET

In addition to the general operating conditions applicable to the successful toration of a fiber from a single fiberization center, various general rules must be observed when torating in a system containing multiple rows, each row in turn containing plural fiberizing centers. In this respect, and expanding on the generalized rules outlined above, it is desirable that the inter-axial separation between adjacent fiberizing centers arranged in a series transversely of the direction of flow of the blast should be on the order of at least 2 or 3 secondary jet orifice diameters, while the interaxial separation between adjacent fiberizing centers lying along the longitudinal axis of flow of the blast must be on the order of at least 7 to 10 secondary jet orifice diameters. The number of rows of fiberizing centers which may successfully be served by a single blast is determined by the residual energy of the blast at the most remote fiberizing center, i.e., that positioned furtherest downstream from the source of the blast. It is desirable to maintain a ratio between the velocity, or kinetic energy per unit of volume, of the carrier jet and that of the operational area of the blast which is constant for each of the fiberizing centers. It is possible to utilize a broad range of velocity values for both the primary and secondary jets, but it is necessary to provide a secondary jet of kinetic energy per unit of volume greater than the kinetic energy per unit of volume of the primary jet. The overall range of ratios of secondary jet to primary jet kinetic energies, per unit of volume, is from slightly greater than unity up to about 40 to 1, and we prefer a ratio between 4 to 1 and 25 to 1.

In maintaining the desired interaction of the secondary jet and the primary jet it has already been noted that it is possible to vary either the velocity of the angle of orientation of the secondary jet with respect to the blast. The angle of the carrier jet relative to the blast or to the plane of emission of the jet may be varied over a considerable range from the perpendicular position. For example, the carrier jet may be directed into the blast at an angle inclined upstream of the blast, for instance, up to about 45° from the perpendicular position; and the angle of the carrier jet may also be inclined downstream of the blast, for instance, through a range of about 45° from the perpendicular position. Preferably the carrier jet is either positioned so as to enter the blast in a path which is substantially perpendicular to the direction of the blast, or is inclined somewhat downstream of the blast, the latter inclination being particularly desirable for the downstream fiberizing centers where multiple fiberizing centers are located upstream and downstream with respect to each other, as in FIG. 4.

With respect to the size of the carrier jet orifice, we prefer to use carrier jets of about the same size as heretofore stated with respect to glass orifice sizes, that is, about 1 to 3 mm.

ANGLE OF JET TO BLAST

The glass may be emitted from a glass orifice by delivery through a passage extended at any of a wide range of angles upstream of the orifice, this factor not being of importance since the forces of the interaction of the carrier jet and blast are the controlling forces, the glass having been delivered from the orifice without any substantial kinetic energy.

INTER-AXIAL SPACING RANGE (PART D)

Additional control may be exercised over the results obtained by varying the rate of flow of the blast. Further, by staggering the orifices in successive rows, it is possible to increase the density of fiberization centers to bring the minimum inter-axial separation between successive rows down to something on the order to 5 secondary jet orifice diameters.

Since appreciable amounts of energy are extracted from the blast at each row of fiberizing, centers, the residual energy available to succeeding rows of fiberizing centers is diminished proportionally. It follows that there exists an upper limit to the number of rows of fiberizing centers which may effectively be located downstream of one another. With presently available equipment being operated with glass, the upper limit would appear to be on the order of ∝ to 5 rows of fiberizing centers located successively downstream of one another.

Still another embodiment of equipment having a high density of fiberizing centers is disclosed in detail in FIGS. 14A though 14D. As seen in these Figures, the crucible is a structure of a generally rectangular configuration having a smooth and flat bottom wall or plate 10A presented to the blast, the latter being indicated by the feathered arrow 12A. Three rows of paired carrier jets and orifices for emitting attenuable material are distributed over the surface of the plate 10A preferably in accordance with the rules governing intra and inter-axial separation set out above.

FIGS. 14A–D

The structure of FIGS. 14A to 14D has an upper and a lower portion, the lower portion in turn serving as a feeding stage 110, comprising that portion of the crucible located below the line 111. The feeding stage 110 has channels 112A, 112B, and 112C and 114A, 114B, and 114C. The channels 112A, 112B, and 112C serve to supply attenuable material to the plate area 10A by way of the orifices indicated at 116A, 116B, and 116C in FIG. 14B. Similarly, channels 114A, 114B, and 114C serve to convey fluid under pressure to the plate area 10A by means of the orifices 118A, 118B, and 118C and of FIG. 14B.

The upper portion of the crucible, namely, that portion lying above the line 111, comprises the supply portion. The supply portion accommodates the incoming fluids, i.e., the bulk form of the secondary jet and the attenuable material. As indicated particularly in FIGS. 14C and 14D taken along the section lines 14C and 14D respectively of FIG. 14A, the pressurized fluid comprising the secondary jet enters the upper portion of the structure via either or both of the tubes 120A and 120B, where after passing through chambers 122A and 122B it flows as indicated by the arrows into the channels 114A, 114B, and 114C via slots 124A, 124B, and 124C and 126A, 126B, and 126C. The jet fluid is then discharged through the several jet orifices 118A, 118B and 118C.

The attenuable material is fed into the housing 110 in the form of a small stream shielded by a tube 128 and after accumulating in the chamber 130 it distributes itself within the channels 112A, 112B and 112C.

At either end of the housing 110 there are located solid metallic members 132A and 132B, which serve both as clamps for positioning the crucible in the desired relationship with respect to the blast and also as electrical contacts for establishing electrical connection with an appropriate electrical energy source (not shown), the latter serving to resistively heat the crucible so as to raise or maintain the temperature of the secondary jet and attenuable material at a desired value.

In the embodiment of FIGS. 14A to 14D it is contemplated that the glass will be melted in some furnace and then delivered in a stream through the tube 128, the rate of delivery being sufficient to provide a level of glass somewhat above the level indicated at 111 in order to assure that the channels 112A, 112B and 112C will remain full and thus provide for adequate supply to the glass emission orifices 116A, 116B and 116C.

FIGS. 15A–D

Turning now to the embodiment illustrated in FIGS. 15A to 15D, it is first pointed out that this embodiment is adapted to operate in conjunction with a glass composition melting furnace of any desired known type, from which the molten glass is fed through a forehearth to the points of use.

In the plan view of FIG. 15B, a portion of a forehearth is indicated at 134, and this forehearth is provided with forehearth branches or channels 136, 138 and 140, these branches also being shown in FIG. 15A.

Along each forehearth branch a plurality of glass tapping stations are provided, 10 being shown in each branch in FIG. 15B, being respectively identified as stations A to J inclusive. At each one of these tapping stations along each one of the forehearth branches, equipment is arranged in order to provide a multiplicity of fiberizing centers to be fed with glass from each tapping station.

Equipment arranged at each tapping station includes a glass crucible, the crucible for the forehearth branch 136 being indicated at 142 in FIGS. 15A and 15B and being shown in enlarged elevation and section, respectively, in FIGS. 15C and 15D. A similar series of crucibles 144 are provided for the tapping stations associated with forehearth branch 138, and a similar series of crucibles 146 is likewise associated with the forehearth branch 140. Each crucible 142, 144 and 146 is provided with discharge passage means indicated at 164 in FIG. 15D and providing either a series of individual glass discharge orifices or alternatively a slot such as described above with reference to FIGS. 12 and 12A.

The number of fiberizing centers which can be provided, side by side, along a given crucible can vary within wide limits. In general, good results can be achieved, and a high rate of combined production attained, with up to about 100 fiberizing centers.

At each fiberizing center associated with each tapping station along each of the three forehearth branches, a mechanism indicated at 154, 156 or 158 is provided for developing the primary jet or blast and, as seen in FIGS. 15C and 15D, this mechanism is provided with lips 44 for directing the blast in a generally horizontal direction past the glass orifice means 164.

At each tapping station there is further provided a means for developing the secondary jet, these means being indicated at 148, 150 and 152 in FIG. 15A, there being one such means for each tapping station.

In FIG. 15B the full showing of the jet devices 148, 150 and 152 has been omitted for the sake of clarity and in order to show the blast devices 154, 156 and 158 which lie beneath the jet devices. However in FIG. 15B the point of delivery of the carrier jets has been indicated at 148, 150 and 152.

Turning again to FIGS. 15C and 15D, it will be seen that each of the devices 148 has a delivery or supply pipe 56 extending to a manifold 56A having a group of jet discharge nozzles 162 positioned between the glass supply means 164 and the lips 44 of the blast generator. It will be understood that the series of nozzles 162 is arranged in side-by-side relation extended transversely of the blast 12A, the blast nozzles 162 having orifices located just upstream of the glass supply means 164.

In the pattern of the equipment as shown in FIGS. 15A and 15B, it will be understood that the blasts provided at the several tapping stations are established in directions extending transverse to the forehearth branches, i.e., to the right as viewed in FIGS. 15A and 15B. In consequence of the interaction of the jets with the several blasts at the fiberizing centers, the fibers produced have a tendency to leave the fiberization area in a direction inclined somewhat downwardly from the mean plane of the fiberizing stations, so that the fibers produced at the tapping stations associated with the forehearth branch 136 may readily be guided as by the inclined hollow guide 168 below the stream of fibers produced at the tapping stations along the forehearth branch 138. These latter fibers are guided through the hollow guide 170 which, in turn, is positioned in large part beneath the similar hollow guide 172 provided for the fibers produced at the tapping stations along the forehearth branch 140. The hollow guides are conveniently made in the form of a duct, with closed sides and of a section which changes along the length so that it is of size appropriate to cooperate with the plural fiberizing centers at one end, and with the collecting conveyor at the other end.

The several hollow guides 168, 170 and 172 have their discharge ends positioned in a region near one end of a fiber or fiber blanket conveyor or collector indicated at 180 which may be of known type comprising a perforate conveyor belt with a suction means arranged between the top and bottom runs of the conveyor, in order to assist collection of the fibers upon the conveyor.

As shown in FIGS. 15A and 15B, the fiber ply developed from each of the forehearth branches may be supplied with a binder, for instance, a thermosetting binder supplied to both the top and bottom surfaces of the ply, by spray devices indicated at 174, 176 and 178. The fact that the total blanket being laid up on the conveyor 180 is made up of several plies, each of which is separately produced and can therefore be separately impregnated with binder, provides for highly effective distribution of the binder throughout the thickness of the total blanket and, in effect, provides for union of the plies together after they are superimposed upon each other on the conveyor. It will be understood that if a thermosetting binder is employed, the blanket may be delivered from the conveyor 180 through or past any suitable heating means, such as an oven, for the purpose of curing or setting the binder. The system of FIGS. to 15D affords a capability of large scale production of fibers by toration particularly because of high density of fiberizing centers provided.

BLAST AND JET TEMPERATURES

In an installation such as shown in FIGS. 15A to 15D, both the carrier jet generators 148, 150 and 152, and the blast generators 154, 156 and 158 may comprise internal combustion chambers of similar design, each being rated to provide a combustion temperature up to about 1900° C, athough for most purposes the temperature used may be substantially below the maximum of the burners. This is particularly so with respect to the carrier jet generator where the temperature range is ordinarily between 600° C and 1100° C for equipment embodying a stainless steel bushing crucible and jet chamber arrangement. A range from room temperature up to about 1500° C is appropriate for platinum crucibles and jet chambers. Even up to about 1900° C may be used for refractory (e.g. sintered magnesium oxide) equipment. For the primary jet, when the attenuable material is glass, we prefer to operate at temperatures of from about 1250° C to about 1650° C.

BLAST AND JET VELOCITIES AND PRESSURES

The burners are desirably capable of producing a sustained output having a velocity of up to 800m per second, although for most purposes the velocity is between about 500m and 600m per second for the carrier jet, and between about 150m to 400m per second for the blast.

Although having a practical upper limit of 4 bars of pressure, the general range of pressure values for the carrier jet is between 1 and 2.4 bars. Similarly, the upper limit of the dynamic pressure for the burner blast is about 200cm of water, while the optimum range is between 10cm and 100cm of water at a blast orifice lip separation of 6mm to 10mm.

In most embodiments of the present invention it is preferred that the distance separating the outer lip of the blast burner and the axis of the closest carrier jet is on the order of 6mm to 15mm. The separation between the downstream edge of the carrier jet orifice and the upstream edge of the orifice supplying the attenuable material is preferably on the order of 0mm to 0.5mm.

In comparing the production capacity of the facility depicted in FIGS. 15A through 15D, it should be noted that orifice pull rates of 20 kg to 25 kg per fiberizing center per day of fibers having an average diameter of, for example, 6 microns, is possible.

FIBER SIZES AND CHARACTERISTICS

Attention is now turned to a discussion of torated fibers, such fibers being the resultant of toration and being an important aspect of the present invention.

Torated fibers are of advantageous fineness, being comparable in this regard, as indicated in Table I above, to the best of the fibers that can be produced by the aerocor and strand prior art processes, and have a diameter generally in the range of about 0.5 to about 10 microns.

With respect to the length of torated fibers, it is pointed out that there is no theoretical limit to the length of the fiber that can be produced by toration. If the collection means utilized is selected so as to minimize the points of possible breaking of the fibers, then the collected fiber product can be composed of fibers which are extremely long. This may be more clearly understood by consideration of the path followed by the glass when being attenuated into a fiber from the glass cone. While the fiber solidifies, its critical radius of curvature, that is, the radius of curvature causing the fiber to break, increases. It is a characteristic of the invention that the fiber for at least much, if not all of its travel during toration, has a path which is approximately helicoidal, with the pitch and the amplitude increasing in the direction of flow of the fiber, and accordingly, while being cooled, the fiber is subjected to a radius of curvature which becomes greater and greater. As a result the risk of fiber breakage due to flexion is extremely small.

However, taking into account practical considerations with respect to the application of binder, the collection of fibers, the matting of fibers into wool or blanket form, fiber compaction, and fiber take-away and packaging, the maximum length of fibers is not necessary to be attained in order to produce highly advantageous products.

Torated fibers can be made from a wide variety of glasses, as above discussed, and the consequence of both the torating and of the selection of an appropriate glass can be fibers having excellent high temperature properties.

When torated fibers are assembled in the form of thermal insulation wool for building insulation, the products may have a unique low density, for example, from about 7 to about 25 kg/cubic meter, and such insulation products characteristically have very high thermal insulation capabilities. Further, such products made by toration are characterized by a substantially complete absence of any slugs, pellets, hooks, or other undesirable inclusions.

Further, products made by toration have an excellent thickness recovery after compaction and a very good total tensile strength. It is highly probable that these excellent qualities are due to the great length of the fibers and to the high tensile strength of the individual fibers.

Still further, products made of torated fibers have a remarkably soft and silky "feel." The "hand" and "feel" of the products made of torated fibers are outstanding, for reasons not now completely identifiable with precision, but which include the fiber's physical characteristics set forth above.

SPECIFIC EXAMPLES

The following examples of toration relate the experimental conditions to the results obtained from a series of runs on equipment such as is disclosed herein.

EXAMPLE I

Example I presents a series of runs conducted with equipment of the general kind discussed in FIGS. 9A, 9B and 9C and the results are given in Table I.

TABLE I

| | Blast | | | Jet | | | Glass | Orifice Pull | | Arithmetic Mean Fiber |
|---|---|---|---|---|---|---|---|---|---|---|
| Example No. | Temp. ° C. | Pressure $cmH_2O$ | Velocity m/sec. | Pressure (bar) | Velocity m/sec. | Temp. ° C. | Cone Temp. ° C. | Rate kg/hole 24 hrs. | Micronaire Reading | Diameter in Microns |
| 1 | 1580 | 45 | 224 | 2 | 580 | 800 | 1050 | 11.1 | 3.9 | — |
| 2 | 1580 | 62 | 262 | 2 | 580 | 800 | 1050 | 14.1 | 3.9 | 4.9 |
| 3 | 1580 | 72 | 283 | 2 | 580 | 800 | 1050 | 14.5 | 3.3 | 4.6 |
| 4 | 1580 | 72 | 283 | 2 | 580 | 800 | 1050 | 8.6 | 2.45 | 3.5 |
| 5 | 1580 | 72 | 283 | 2 | 580 | 800 | 1050 | 22.0 | 4.4 | 6.0 |
| 6 | 1580 | 62 | 262 | 2 | 580 | 800 | 1050 | 17.3 | 4.3 | 5.4 |

The glass composition used was as given below:

| | |
|---|---|
| $SiO_2$ | 57.00 |
| $Al_2O_3$ | 4.10 |
| $Fe_2O_3$ | .35 |
| CaO | 11.31 |
| MgO | 3.69 |
| $Na_2O$ | 13.16 |
| $K_2O$ | 1.54 |
| BaO | 1.60 |
| $B_2O_3$ | 4.55 |
| $F_2$ | 2.70 |

Torating under the operating conditions given in each of the above examples resulted in very good fiberization performance. A broad range of glass orifice pull rates extending from 8.6 to 22kg. per hole per 24 hours was recorded. A corresponding range of fiber diameters likewise was recorded. Indications of the fiber diameters are recorded in Table I in terms of the diameter, in microns, of a fiber representing the arithmetic mean value of measured fiber diameters, and also on the basis of a fiber fineness index, or a "micronaire," determination with a 5 gram sample, the latter being a standard measuring technique in the glass wool industry wherein a predetermined mass or sample of the fibers is positioned within a housing so as to form a permeable barrier to air passing through the housing under a predetermined pressure and the reading is of the air flow through the sample which is generated by the pressure drop through the sample, stated in terms empirically related to fiber diameter. In general, the finer the fibers the higher the fiber count of the sample, and the more resistance offered to the passage of air through the sample. In this manner an indication is given of the average fiber diameter of the sample. The micronaire readings and the measured diameters show a close correlation in Examples 1 through 6.

EXAMPLE II

Example II presents a series of runs conducted with equipment of the general kind disclosed in FIG. 15D, using a glass slot, but not a multiple set-up as in FIGS. 15A and 15B. The results are given in Table I.

TABLE II

| Example No. | Burner Temp. ° C. | Burner Pressure cmH2O | Burner Velocity m/sec. | Jet Pressure (bar) | Jet Velocity m/sec. | Jet Temp. ° C. | Glass Cone Temp. ° C. | Orifice Pull Rate kg/hole 24 hrs. | Micronaire Reading |
|---|---|---|---|---|---|---|---|---|---|
| 7. | 1620 | 60 | 261 | 1.9 | 606 | 900 | 1030 | 13.8 | 4.8 |
| 8. | 1600 | 58 | 256 | 1.9 | 606 | 900 | 1010 | 6.6 | 2.4 |
| 9. | 1620 | 68 | 278 | 2 | 606 | 900 | 1030 | 15.0 | 4.1 |
| 10. | 1620 | 58 | 265 | 2 | 606 | 900 | 1000 | 9.6 | 4.0 |

The glass composition used for the runs of Example II is as follows:

| | |
|---|---|
| $SiO_2$ | 63.00% |
| $Fe_2O_3$ | 0.30 |
| $Al_2O_3$ | 2.95 |
| CaO | 7.35 |
| MgO | 3.10 |
| $Na_2O$ | 14.10 |
| $K_2O$ | 0.80 |
| $B_2O_3$ | 5.90 |
| BaO | 2.50 |

A broad range of glass orifice pull rates resulted in a correspondingly broad range of fiber diameters. In general, it may be said that good fiberization was obtained yielding long, fine fibers at a high rate.

FIGURES 16–27

These figures illustrate improvements and variations both in the apparatus and in the method for making glass fiber blankets or mats by toration, which improvements and variations provide for suppression of pollution in such operations.

In our copending application Ser. No. 456,878 identified above there are disclosed certain techniques for the suppression of pollution in glass fiber manufacture as applied to a variety of fiberizing techniques, and the present invention is concerned with adaptations of certain of the techniques disclosed in that application, which adaptations are particularly devised for the suppression of pollution in fiberizing techniques, of the kind disclosed in our application Ser. No. 353,983 also identified above.

The advantages and features of the arrangements of FIGS. 16–27 can most readily be explained after consideration of at least some of the equipment as represented more or less diagrammatically in the accompanying drawings. Therefore, reference is first made to FIG. 16 and in connection with that figure it is to be noted that while certain aspects of the equipment for fiberization and fiber collection may be physically arranged in the general manner indicated in FIG. 16, the principals to be explained with relation to FIG. 16 are not necessarily limited to that arrangement, but are equally applicable to other arrangements such as that shown in FIGS. 17 to 27.

It is also to be noted in connection with the following description of FIG. 16 that certain of the parts of the fiberization equipment there shown are identified by reference numerals which are either the same as or related to those employed in FIGS. 15A, 15B, 15C and 15D hereinabove described; and that certain of the parts of the pollution suppression equipment are identified by reference numerals which are either the same as or related to those employed in the drawings illustrating various of the embodiments of pollution suppression equipment as disclosed in the drawings of copending application Ser. No. 456,878.

In addition to certain features of the pollution suppression equipment which are arranged in the same manner or in the same general manner as in our copending application Ser. No. 456,878, the present application also discloses other features of arrangement which are not disclosed in said prior application.

Considering now the fiberization equipment shown in FIG. 16, reference is first made to the blast or principal jet generators 154, 156 and 158 and also to the cooperating secondary or carrier jet generators 148, 150 and 152. These pairs of generators, as is fully disclosed hereinabove each create a zone of interaction into which molten glass is admitted from orifices in the crucibles 142, 144 and 146. The molten glass may be supplied to the crucibles, for instance from the forehearth branches 136, 138 and 140.

As explained hereinabove, a plurality of secondary jets are preferably associated with each blast, and a plurality of glass streams, one associated with each secondary jet, are admitted into each blast, thereby providing groups of fiberizing stations associated with each blast generator 154, 156 and 158. Still further, as explained above, a plurality of the blast generators and associated generators for secondary jets, and also orifices for admission of glass streams, are provided transversely of equipment. Thus when viewed as in FIG. 16, each blast generator, for instance the generator 154, represents only one of a series which are aligned with each other. All of the fiberizing centers established by the groups of generators deliver the attenuated fibers into a common hollow guide 168, 170 or 172. These guides in effect form channels for directing the fibers from the several groups of fiberization stations downwardly in an inclined path from the zone of fiberization toward the perforated fiber collecting conveyor 180. Guides of this type are desirably tapered in plan form in the manner shown in FIG. 15B hereinabove described.

As will be understood, the gases from the blast generators and the jet generators in each group flow with the fibers into the upper or inlet ends of the channels formed in the hollow guides 168, 170 and 172, and each of these fiber and gas streams is indicated in FIG. 16 by the reference numberal 12.

As seen in FIG. 16, the fiberization equipment is arranged in spaced relation to the fiber collecting conveyor 180 and is located in a fiber receiving chamber 100 formed by various wall elements and preferably being substantially closed. The fiber collecting conveyor 180 defines at least in large part one of the walls of the collecting chamber and this conveyor serves to carry the formed blanket to the left out of the chamber below the left hand end wall. As will be understood, appropriate openings are provided for the introduction of the fuel and air needed for the blast and jet generators, and in addition there are openings appropriate to the accommodation of the molten glass forehearth branches and crucibles to provide for admission of the molten glass into the fiberization equipment.

To provide for collection of the fibers on the perforated fiber collecting conveyor suction chambers 16 are positioned beneath the fiber collecting run of the conveyor, the chambers being open at the top and having ducts 17 connected therewith and respectively communicating with cyclone separators 18. Each cyclone separator has an off-take connection extended to a blower or exhaust fan 19 which discharges the exhausted gases into the duct 34, constituting a recirculating duct which is connected with one end of the fiber receiving chamber 100. Baffles 132 in the region where the duct 34 is connected with the chamber 100 serve to uniformly distribute the recirculating gases in the fiber receiving chamber.

For the purpose of cooling the fibers as they are delivered from the guides 168, 170 and 172, water sprayers 50 are provided, preferably both above and below the fiber and gas stream 12 delivered from each of the guides. Downstream of the water sprayers, additional spray nozzles 13 are provided and these additional nozzles serve to spary onto the fibers a liquid binder resin material, preferably a binder which is adapted to harden or cure upon subsequent heating of the formed blanket, for instance in an oven through which the blanket is delivered after being discharged from the left of FIG. 16.

Because of the spraying of the fibers with the water and with the liquid binder resin material, the gases which are withdrawn through the suction chambers 16 carry with them substantial quantities of moisture and also resin constituents. It is contemplated that such constituents and also small fiber pieces which may be carried through the collecting conveyor by the gases being exhausted, should be removed from the gases before recirculation thereof back into the fiber receiving chamber. This separation is effected in the embodiment illustrated by means of the cyclone separators 18. The separation is enhanced and assisted by the scrubbing action of additional water spraying nozzles 45 which are arranged within the suction chambers 16.

The general flow pattern of the gases in the recirculating system shown in FIG. 16 is indicated at various places by the arrows 29. In the fiber receiving chamber the gas flow is not only established by the exhaust fans 19, but also tends to be augmented by the action of the blast and jets at the fiberizing centers. Because the upper ends of the guides 168, 170 and 172 are open in the zones of the fiberizing centers, portions of the recirculating gases are induced to enter the upper ends of the guides and other portions join the gas and fiber streams 12 beyond the discharge ends of the guides.

The liquid constituents which are separated in the cyclone separators 18, together with various constituents entrained thereby are discharged from the lower ends of the separators through the discharge openings 25 and collect in the sump 103, and in this way various of the liquid and solid constituents which are picked up or entrained by the gas flow stream are separated and isolated, so that they are not returned into the fiber receiving chamber with the recirculating gases. For further suppression of pollution, these separated liquids are specially treated as will be described hereinafter, but here it is first noted that although virtually all of the gases which are drawn from the receiving chamber through the fiber collecting conveyor are recirculated to the fiber receiving chamber, some gases are withdrawn from the receiving chamber through the duct 35 under the influence of the fan 44. This fraction of the circulating gases represents a quantity on the order to 5% to 10% of the total amount flowing through the perforated collecting conveyor and represents approximately that percentage of additional gases which are constantly being introduced under the action of the blast and jet generators employed at the fiberization stations. The gases withdrawn under the action of the fan 44 are delivered into and through a burner device 39 in which the temperature is elevated to a point preferably above 600° C, after which the treated gases may be expelled to the atmosphere substantially without objectionable pollution. All of the remaining 90% to 95% of the gases are recirculated, and thus do not pollute the atmosphere.

In addition to recirculation of the gases, the system in FIG. 16 also contemplates treatment of and recirculation of water delivered from the cyclone separators 18. For this purpose, a pump 104 transfers the water from the sump 103 into the tank 52, a screen or filter diagrammatically indicated at 51 being interposed in order to separate solids before the water is delivered into the tank. The water is recirculated from the tank 52 by a pump 53 through the heat exchanger 105 for the purpose of cooling the water, the cooled water being returned to the tank 52 through the screen or filter device 51 providing for separation of solids. The cooler 105 is adapted to be cooled by a heat transfer medium recirculated by means of a pump 107 through the cooling unit 106. The details of construction of these parts may take a variety of forms and need not be considered herein as they form no part of the present invention per se.

Water is also withdrawn from the tank 52 by means of pump 55 and is delivered thereby, preferably under suitable adjustable controls not illustrated, to the water supply nozzles 50 and 45. The pump 55 may also deliver water to the station 108 for preparation of the fiber binder or sizing which may take any suitable form and from which the binder material is delivered to the spray nozzles 13.

Still further, some of the water is preferably delivered to the station 109 for treatment to separate resin constituents carried in solution. This is preferably effected in the manner more fully described in our application Ser. No. 456,878, according to which the water is subjected to an increased pressure and to an increased temperature, after which it is cooled. This treatment results in insolublizing resin constituents, which may then readily be separated, for instance by means of a centrifuge. The purified water is then returned to the tank 52 for reuse. The solid constituents separated at the station 109 and also by the filter 51 associated with the tank 52 are transferred by means of suitable conveyors 112 and 57 to the waste treatment station 113 which, as disclosed in our application just mentioned, may consist of a heater or burner in which the solid waste materials are brought to a temperature of the order of 600° to 700° C so as to burn the resin binder constituents present and also to sinter any fibers present. The latter may if desired be reintroduced into the fiber circulation system, i.e. into the constituents from which the molten glass is prepared for fiberization.

Make-up water may be introduced into the system by means of the supply connection 111 delivering into the tank 52.

Various of the foregoing structural and operational features described with reference to FIG. 16 and also incorporated in the embodiment illustrated in FIGS. 17 to 27, but in addition certain portions of the equipment are differently arranged and further advantageous features are incorporated in the arrangement of FIGS. 17 to 27.

For the purpose of this explanation and description, reference is first made to FIG. 21 which is a schematic illustration of one of several fiberizing units or stations incorporated in the equipment shown more generally in FIGS. 17, 18, 19 and 20. As above indicated, FIG. 21 also schematically shows the relationship of parts at a fiberizing station on a much larger scale than the other figures of this group. Molten glass may be fed to the station shown in FIG. 21 in the same general manner as described above with reference to FIG. 16, i.e. by means of a forehearth branch 136 communicating with a crucible 142 from which streams of molten glass may be admitted into the fiberizing zones as established by the interaction of secondary jets created by the generator 148 cooperating with the blast delivered from the blast generator 154. The gas and fiber stream 12 delivered from this fiberizing station is received in the upper or open inlet end of the tubular guide 168 which directs the stream downwardly to the perforated fiber collecting conveyor 180 (see FIGS. 17, 18 and 20).

As in the arrangement of FIG. 16 and further as in various of the arrangements described hereinabove, for instance in connection with FIGS. 15A, 15B, 15C and 15D, the fiberizing centers are arranged in multiple transversely of the collecting conveyor and in addition, the fiberizing units or stations are multiplied lengthwise of the collecting conveyor as is schematically illustrated in FIG. 20 wherein five forehearth branches 136 to 140 are shown, as well as the five associated tubular guides 168 to 172.

In FIG. 18 the multiplication of the fiberizing stations transversely of the collecting conveyor 180 is indicated schematically at *a* to *f*.

FIG. 18 also shows in dot and dash outline the location of the forehearth branches 136 to 140 for feeding each of the groups of fiberizing stations *a* to *f*. These forehearth branches may be fed from a forehearth as indicated at FH.

It is to be understood that each one of the fiberizing stations *a* to *f* will include a plurality of fiberizing centers, i.e. a plurality of secondary jets cooperating with individual streams of molten glass, in the manner fully developed hereinabove.

In the embodiment illustrated in FIGS. 18 to 27 inclusive, and especially in FIGS. 18 to 19 inclusive, various reference characters have been applied to parts of the equipment corresponding to many of the parts shown in FIG. 16. It will be seen, however, that FIGS. 18 to 27 inclusive schematically represent a different organization and arrangement of a number of the structural features and devices employed. Some of the significant differences are discussed just below.

As will be seen in the isometric schematic view of FIG. 17 and in FIGS. 20 and 21, the fiber receiving chamber 100 overlies the fiber collecting conveyor 180 and the fiber receiving chamber has upward extensions 100*a* in the region of each one of the guides 168 and 172, with the fiberizing equipment associated with these guides arranged at the upper portion of each extension. Portions of two such upward extensions are generally indicated in schematic outline in FIG. 21 and it will be seen that adjacent extensions 100*a* are spaced from each other sufficiently to accommodate an operator, as is indicated, so that the operator will have access to certain adjustable equipment to be described.

As in FIG. 16 suction chambers 16 are arranged under the fiber collecting run of the conveyor 180, and these chambers are connected by ducts 17 with the cyclone separators 18. Exhaust fans 19 draw the gases from the suction chamber 16 through the cyclone separators 18 and deliver the gases, after separation of liquids carried in suspension, into the duct 34 provided for recirculation of the gases. In the embodiment shown in FIGS. 17 to 21, the recirculating gas stream is subdivided into separate portions and reintroduced into the system at different points. Thus, the branch ducts 34*a* and 34*b* extend laterally from the principal duct 34, and as best seen in FIGS. 17 and 18, the continuation of the duct 34 toward the left in those figures includes a U-shaped section 34*c* which delivers a portion of the recirculating gases directly into the end of the chamber 100 upstream of the series of fiberizing stations.

Baffles 132 are also provided to uniformly distribute the gas flow into the chamber 100. Adjustable vanes 101 in the duct 34c provide for control of the proportion of the gases delivered directly to the end of the chamber 100 and to the region of the fiber guides 168–172. Control of the gas distribution between these two regions is important as it may be used to influence the general character of the fiber blanket, especially with respect to the orientation of the fibers. Increase in the opening of the vanes with consequent increase in the amount of the gases delivered into the end of chamber 100 tends to increase orientation of the fibers lengthwise of the conveyor 180. On the other hand, decrease in the opening of the vanes 101 with consequent increase of the amount of the gases delivered to the region of the fiber guides 168–172 tends to increase the transverse orientation of fibers.

A stack of offtake flue ST is provided and may be connected with the duct 34 through the normally closed vanes 34*d*. A normally closed vent gate 34*e* (see FIG. 17) is also provided. It is contemplated that for safety purposes the gate 34*e* and the vanes 34*d* may be opened, in which event air will enter the duct 34 past the gate 34*e* and the gases will be discharged through the stack ST instead of being recirculated.

As best seen in FIG. 21, the gases which flow into the branch duct 34*a* are delivered through apertures adjacent to the upper or inlet end of the adjacent guide, FIG. 21 illustrating this relationship with respect to the fiber guide indicated by the numeral 168. At the upper end of the guide 168, the guide is shaped to avoid turbulence in the flow, and the gases from this source enter the upper end of the guide in part by induction which tends to be set up by the blasts and jets cooperating with guide 168. Only one blast generator 154 and one jet generator 148 is shown in FIG. 21, but it will be understood that these devices are arranged in multiples as is indicated schematically at *a* to *f* in FIGS. 17 and 18. Such multiple arrangement is also shown in FIG. 15B.

With further reference to FIG. 21, it will be seen that some of the gases flowing through the branch duct 34*b* are also delivered through apertures into the region of the upper or entrance of the guide 168 which is similarly enlarged to minimize turbulent flow. This wall further preferably includes an adjustable movable wall section 168*a* pivoted at 168*b* and provided with an adjustable screw device 168*c* having a handle projecting into the space between adjacent extensions 100*a* of the receiving chamber, so that an operator may adjust the position of this wall section. Preferably such a wall section, separately adjustable, is provided in alignment with each of the fiberizing stations *a* to *f*, thereby providing control over the fiber distribution, as is described more fully hereinafter. One or more access doors may be provided so that an operator may readily observe the operating conditions and may also have service access to portions of the equipment at the fiberizing centers.

From further reference to FIG. 21, it will be seen that each of the branch ducts 34*a* and 34*b* is provided with additional openings for delivery of some of the gases adjacent the opposite sides of the duct 168 in the spaces provided within the upward chamber extension 100*a*, these portions of the gases flowing downwardly into the main part of the chamber 100 adjacent to the lower or discharge end of the guide 168.

Toward its lower end at least one wall of the guide 168 is also desirably provided with a flexible or deflectable section 168*d*, with an adjustable screw 168*e* by which the operator may adjust the position of the flexible wall and thereby effect further control over fiber distribution in the manner described hereinafter.

Referring now to FIGS. 22 to 27 inclusive which schematically illustrate certain aspects to the fiber distribution control provided with the adjustable features above described, it is first noted that FIGS. 22 and 23 each indicate in outline the guide 168, the upper or inlet end of the guide being presented toward the top of these figures and the discharge end toward the bottom thereof. It will here be seen that six pivoted wall sections 168*a* are indicated, these being respectively aligned with the fiberizing zones of *a* to *f*. Each one of these wall sections is, of course, pivotally mounted and adjustable in the manner described above with reference to FIG. 21. At times, fiberization or fiber distribution may develop some lack of uniformity across the width of the guide 168, as is illustrated in the region of FIG. 22 indicated by the arrow *x*. This condition may be remedied and the fibers more uniformly distributed across the width of the guide by adjustment of the pivoted wall section 168*a* lying in the path indicated by the letter *x* in FIG. 22. The adjustment to correct would conform with that shown in FIGS. 21 and 23, in which the gas flow passage from the duct 34*b* is reduced in the zone where the fibers are not sufficiently concentrated. The result of this is that additional fibers flowing in the adjacent zones will flow into the zone where the fiber concentration is insufficient, this action being schematically represented by various flow lines and arrows applied to FIG. 23.

In instances where the fiber concentration is insufficient toward one edge of the guide, as compared with the other edge, (for instances toward the right as compared with the left when viewed as in FIG. 24) the flexible wall section 168*d* may be adjusted to an inclined position by means of the adjustment screws 168*e*. The nature of this adjustment will be clear from the schematic illustration of FIGS. 26 and 27. The effect of this adjustment is to cause some of the fiber flow to shift from the left toward the right as viewed in FIGS. 26 and 27, this shift being schematically indicated by the flow lines in FIG. 25.

From the foregoing it will be seen that the arrangement of the present application provides for effective and extensive suppression of pollution originating from glass fiber blanket manufacturing plants, especially plants utilizing toration for fiber production as herein disclosed.

The manner of recirculating the gases present in and around the fiber equipment is advantageously utilized, particularly by dividing the recirculating gas stream into portions which are reintroduced at different points in the system, thereby increasing the uniformity of fiber distribution in the blanket being made. Tendencies for inaccuracy in fiber distribution may be corrected by adjustable equipment readily accessible to an operator during the fiber production operation.

In connection with various of the devices of the pollution suppression equipment, for instance the units shown in FIG. 16 at 39, 105, 106, 108, 109 and 113, it is pointed out that further information concerning the pollution suppression equipment may be found in our copending application Ser. No. 456,878, and such information is incorporated herein by reference.

We claim:

1. Equipment for making resin bonded glass fiber blanket comprising a substantially closed fiber receiving chamber, a perforated fiber collecting conveyor defining at least a large part of a wall of said chamber, means for developing a gaseous blast in said chamber, means for developing a gaseous jet of smaller cross section than the blast, directed at an angle to the blast and penetrating the blast to produce a zone of interaction of the blast and jet, means for introducing molten attenuable material into said zone of interaction and thereby effect fiberization thereof in the receiving chamber, suction means behind the fiber collecting conveyor developing gaseous currents through the fiber collecting conveyor and thereby form a fibrous blanket on the conveyor, means for spraying water and curable resin binder material on the fibers, means for separating water with resinous material carried thereby from said gaseous currents, and means for recirculating the gases to and through the receiving chamber and the conveyor.

2. Equipment as defined in claim 1 and further including means for separating resinous materials from the separated water, and means for recirculating at least a portion of the water to the water spraying means.

3. Equipment as defined in claim 2 in which the spraying means comprises separate means for spraying water and for spraying liquid resin binder material and in which the water recirculating means delivers water to the water spraying means.

4. Equipment as defined in claim 2 in which the spraying means comprises separate means for separate means for spraying water and for spraying liquid resin binder material and in which the water recirculating means delivers water to the spraying means for the liquid resin binder.

5. Equipment as defined in claim 2 and further including means for cooling the separated water in advance of recirculation thereof to the spraying means.

6. Equipment for making fiber blanket comprising a substantially closed fiber receiving chamber, a perforated fiber collecting conveyor defining at least a large part of a wall of said chamber, means for developing a gaseous blast in said chamber, means for developing a gaseous jet of smaller cross section than the blast, directed at an angle to the blast and penetrating the blast to produce a zone of interaction of the blast and jet, means for introducing attenuable material into said zone of interaction and thereby effect fiberization thereof in the receiving chamber, suction means behind the fiber collecting conveyor developing gaseous currents through the fiber collecting conveyor and thereby form a fibrous blanket on the conveyor, and a duct receiving the gases from said suction means, said duct being connected with the receiving chamber to effect recirculation of said gases.

7. Equipment as defined in claim 6 in which the duct is positioned to deliver at least a portion of the recirculating gases into the receiving chamber in the same general direction of flow as the gaseous blast.

8. Equipment for making resin bonded glass fiber blanket comprising a substantially closed fiber receiving chamber, a perforated fiber collecting conveyor defining at least a large part of the bottom of said chamber, means for developing a gaseous blast in said chamber, means for developing a gaseous jet of smaller cross section than the blast, directed at an angle to the blast and penetrating the blast to produce a zone of interaction of the blast and jet, means for introducing molten glass into said zone of interaction and thereby effect fiberization thereof in the receiving chamber, the means for developing the gaseous blast being located in an upper region of the receiving chamber and being positioned to direct the blast in a path extended over the perforated conveyor, suction means below the conveyor developing a gaseous current downwardly through the fiber collecting conveyor and thereby form a fibrous blanket on the conveyor, means in the receiving chamber for curable liquid resin binder material on the fibers, means for scrubbing the gaseous current with water, means for separating from said current water with resin constituents carried thereby, and a duct for recirculating at least a portion of the scrubbed gaseous current to the receiving chamber, the connection of the duct with the chamber providing for delivery of the gases in the same general direction as the direction of flow of the gaseous blast.

9. Equipment as defined in claim 8 and further including means for separating the water from the resin constituents carried thereby, and means for recirculating the separated water to said scrubbing means.

10. Equipment for making resin bonded glass fiber blanket comprising a substantially closed fiber receiving chamber, a perforated fiber collecting conveyor defining at least a large part of the bottom of said chamber, means for developing a gaseous blast in said chamber, means for developing a gaseous blast in said chamber, means for developing a gaseous jet of smaller cross section than the blast, directed at an angle to the blast and penetrating the blast, to produce a zone of interaction of the blast and jet, means for introducing molten glass into said zone of interaction and thereby effect fiberization thereof in the receiving chamber, the means for developing the gaseous blast being located in an upper region of the receiving chamber and being positioned to direct the blast generally horizontally above the perforated conveyor, fiber guide means inclined downwardly from and in the general direction of the gaseous blast for directing the fibers to the perforated conveyor, suction means for developing a gaseous current downwardly through the fiber collecting conveyor, means in the receiving chamber for spraying curable liquid resin binder material on the fibers, means for separating resin constituents entrained by the gaseous current, and a duct for recirculating at least a portion of the gases from the separating means to the receiving chamber, the duct being connected with the receiving chamber to provide for flow of the recirculating gas stream in a direction to encounter the upper end of the fiber guide means before the lower end thereof.

11. A method for forming a glass fiber blanket on a perforated fiber collecting surface, comprising developing a gaseous blast, directing a gaseous jet of smaller cross section than the blast transversely into the blast to develop a zone of interaction, delivering molten attenuable glass into said zone of interaction and thereby effect fiberization thereof, developing a gaseous current flowing from the region of fiberization to and through the perforated collecting surface, and recirculating the gases of said current from the downstream side of the collecting surface to the region of fiberization.

12. A method as defined in claim 11 and further including spraying curable liquid binder resin material on the fibers, and separating resin constituents entrained in said gaseous current before recirculation of the gases to the region of fiberization.

13. A method as defined in claim 11 and further including applying curable resin material to the fibers, and scrubbing the gaseous current with water downstream of the perforated fiber collecting surface to separate resin constituents entrained by the gases of said current before recirculation thereof to the region of fiberization.

14. A method as defined in claim 13 and further including separating the water and the entrained resin constitutents, and spraying the separated water on the fibers.

15. A method as defined in claim 13 and further including separating the water and the entrained resin constituents, and recirculating the separated water for use in scrubbing the gaseous current.

16. A method as defined in claim 11 in which the recirculating gases are delivered to the region of fiberization with a flow direction generally paralleling the flow of the gaseous blast.

17. Equipment for making glass fiber blanket comprising a substantially closed fiber receiving chamber, a perforated fiber collecting conveyor defining at least a large part of one wall of said chamber, fiberizing means adjacent another wall of the chamber including means for discharging a stream of molten glass and jet means effecting fiber formation by gas blast attenuation of the glass stream and thus developing a fiber laden gaseous current directed toward the conveyor, suction means at the downstream side of the perforated conveyor developing currents through the conveyor and thereby form a fibrous blanket on the upstream side of the conveyor, and ducting receiving gases from said suction means and extended to a region of the receiving chamber adjacent to the fiberizing means, the ducting recirculating at least a portion of the gases into the receiving chamber in the region of the fiberizing means and in a direction to join the fiber laden gaseous current directed toward the conveyor.

18. Equipment as defined in claim 17 and further including means for spraying curable liquid resin fiber binder on the fibers in said fiber laden gaseous current, and means for separating binder resin constituents from the recirculating gases before recirculation thereof into the receiving chamber.

19. Equipment as defined in claim 17 and further including means for spraying water and curable resin binder material on the fibers in said fiber laden gaseous current, means for separating water with resinous materials carried thereby from the gases before recirculation thereof to the receiving chamber.

20. Equipment for making glass fiber blanket comprising a substantially closed fiber receiving chamber, a perforated fiber collecting conveyor defining at least a large part of one wall of said chamber, means for admitting a stream of molten glass into the chamber, means for fiberizing molten glass including jet means for effecting gaseous attenuation of the molten glass in a region spaced from the collecting conveyor, means defining a channel for directing the attenuated fibers from said region to the collecting conveyor, suction means for developing gaseous currents through the fiber collecting conveyor and thereby form a fibrous blanket on the conveyor, a duct receiving the gases from said suction means, and means for dividing the gases into portions and recirculating one portion into the upstream end of said channel and another portion to the fiber collecting side of the fiber collecting conveyor.

21. Equipment for making fiber blanket comprising a substantially closed fiber receiving chamber, a perforated fiber collecting conveyor defining at least a large part of a wall of said chamber, means for admitting a stream of molten glass into the chamber, means for fiberizing molten glass including jet means for effecting gaseous attenuation of the molten glass in a region spaced from the collecting conveyor, means defining a channel for directing the attenuated fibers from said region to the collecting conveyor, suction means at the downstream side of said conveyor for developing gaseous currents through the fiber collecting conveyor and thereby form a fibrous blanket on the conveyor, means for spraying water and curable resin binder material on the fibers after delivery from said channel, means downstream of the conveyor for separating water with resinous materials carried thereby from said gaseous currents, and means for recirculating at least a portion of the gases to and through the fiber directing channel.

22. Equipment as defined in claim 21 and further including means for separating resinous materials from the separated water, and means for recirculating at least a portion of the water to the water spraying means.

23. Equipment as defined in claim 21 and further including means for recirculating a portion of the gases to the fiber collecting side of the fiber collecting conveyor.

24. Equipment for making fiber blanket comprising a substantially closed fiber receiving chamber, a perforated fiber collecting conveyor defining at least a large part of a wall of said chamber, means for admitting a stream of molten glass into the chamber, means for fiberizing molten glass including jet means for effecting gaseous attenuation of the molten glass in a region spaced from the collecting conveyor, means directing the attenuated fibers from said region to the collecting conveyor, suction means for developing gaseous currents through the fiber collecting conveyor and thereby form a fibrous blanket on the conveyor, means for spraying water and curable resin binder material on the fibers after delivery from said channel, means for separating water with resinous materials carried thereby from said gaseous currents, and means for dividing the gases and recirculating separate portions thereof to different regions of the receiving chamber.

25. Equipment for making glass fiber blanket comprising a substantially closed fiber receiving chamber, a perforated fiber collecting conveyor defining at least a large part of one wall of said chamber, means for admitting a stream of molten glass into the chamber, means for fiberizing molten glass including jet means for effecting gaseous attenuation of the molten glass in a region spaced from the collecting conveyor, means defining a channel for directing the attenuated fibers from said region to the collecting conveyor, suction means for developing gaseous currents through the fiber collecting conveyor and thereby form a fibrous blanket on the conveyor, a duct receiving the gases from said suction means, and means for effecting recirculation of at least a portion of said gases including means for dividing the recirculating gas stream into at least two portions one of which is delivered into the receiving chamber in the region of the inlet of said channel and another of which is delivered into the receiving chamber in the region of the fiber collecting conveyor.

26. Equipment as defined in claim 25 and further including adjustable means for varying the proportion of the recirculating gases as between the two divided portions thereof.

27. Equipment for making glass fiber blanket comprising a substantially closed fiber receiving chamber, a perforated fiber collecting conveyor defining at least a large part of one wall of said chamber, means for admitting a stream of molten glass into the chamber, means for fiberizing molten glass including jet means for effecting gaseous attenuation of the molten glass in a region spaced from the collecting conveyor, means defining a channel for directing the attenuated fibers from said region to the collecting conveyor, suction means for developing gaseous currents through the fiber collecting conveyor and thereby form a fibrous blanket on the conveyor, a duct receiving the gases from said suction means, and means for effecting recirculation of at least a portion of said gases including means for dividing the recirculating gas stream into at least two portions one of which is delivered into the upstream end of said channel and another of which is delivered into the receiving chamber in the region of the fiber collecting conveyor.

28. Equipment for making resin bonded fiber blanket from molten attenuable material comprising a substantially closed fiber receiving chamber, a perforated fiber collecting conveyor defining at least a large part of a wall of said chamber, means for developing a gaseous blast in said chamber, means for developing a gaseous jet of smaller cross section than the blast, directed at an angle to the blast and penetrating the blast to produce a zone of interaction of the blast and jet, means for introducing the molten material into said zone of interaction and thereby effect fiberization thereof in the receiving chamber, suction means behind the fiber collecting conveyor developing gaseous currents through the fiber collecting conveyor and thereby form a fibrous blanket on the conveyor, means for spraying water and curable resin binder material on the fibers, means for separating water with resinous material carried thereby from said gaseous currents, and means for recirculating the gases to and through the receiving chamber and the conveyor.

* * * * *

UNITED STATES PATENT AND TRADEMARK OFFICE

CERTIFICATE OF CORRECTION

PATENT NO. : 4,052,183

DATED : October 4, 1977

INVENTOR(S) : Marcel Levecque and Jean A. Battigelli

It is certified that error appears in the above-identified patent and that said Letters Patent are hereby corrected as shown below:

In the title page, change the Related U.S. Application data item [63] to read --Continuation-in-part of Ser. No. 353,983, April 24, 1973, Pat. No. 3,874,886, and of Ser. No. 456,878, April 1, 1974.--.

Col. 1, line 13, after "common" insert --with--.

Col. 2, line 15, delete "GLASS COMPOSITION (PART B)", and insert the heading --FIGURES 16-27--;

line 40, delete "37"; and before "steam" insert --"--;

line 55, "effects" should read --efforts--.

Col. 5, line 16, "the" should read --are--.

Col 11, line 41, after "blast" delete "12A";

line 66, delete "generate".

Col. 27, line 38, after "of" the figure "$\alpha$ " should read --4--.

UNITED STATES PATENT AND TRADEMARK OFFICE

CERTIFICATE OF CORRECTION

PATENT NO. : 4,052,183

DATED : October 4, 1977

INVENTOR(S) : Marcel Levecque and Jean A. Battigelli

It is certified that error appears in the above-identified patent and that said Letters Patent are hereby corrected as shown below:

Col. 32, line 68, "Table I" should read --Table II--.

Col. 36, line 37, "supply" should read --spray--.

Col. 37, line 62, "and" should read --to--.

Col. 40, line 47, delete "for separate means".

Col. 41, line 26, after "for" insert --spraying--.

Signed and Sealed this

*Eleventh* Day of *April 1978*

[SEAL]

*Attest:*

RUTH C. MASON
*Attesting Officer*

LUTRELLE F. PARKER
*Acting Commissioner of Patents and Trademarks*

UNITED STATES PATENT AND TRADEMARK OFFICE
CERTIFICATE OF CORRECTION

PATENT NO. : 4,052,183

DATED : October 4, 1977

INVENTOR(S) : Marcel Levecque and Jean A. Battigelli

It is certified that error appears in the above-identified patent and that said Letters Patent are hereby corrected as shown below:

In the title page, in Item [30], the Foreign Application Priority Data should read --February 10, 1975 France 75.04039--.

Signed and Sealed this

*Seventeenth* Day of *April 1979*

[SEAL]

*Attest:*

RUTH C. MASON
*Attesting Officer*

DONALD W. BANNER
*Commissioner of Patents and Trademarks*